United States Patent [19]
Goto et al.

[11] Patent Number: 5,850,245
[45] Date of Patent: Dec. 15, 1998

[54] PAGE PRINTER

[75] Inventors: Masahiro Goto, Yokohama; Yoji Serizawa, Kawasaki; Toshio Miyamoto, Yokohama; Yuko Ohkama, Tokyo; Saturo Izawa; Yozo Hotta, both of Yokohama; Koichi Tanigawa, Tokyo, all of Japan

[73] Assignee: Canon Kabushiki Kaisha, Japan

[21] Appl. No.: 568,315

[22] Filed: Dec. 6, 1995

[30] Foreign Application Priority Data

Dec. 7, 1994 [JP] Japan ................................. 6-330587

[51] Int. Cl.[6] .............................. B41J 2/385; G01D 9/42
[52] U.S. Cl. ............................................ 347/156; 346/108
[58] Field of Search ................................. 347/156, 153, 347/139, 262, 264, 135; 395/100; 346/160.1, 154, 108

[56] References Cited

U.S. PATENT DOCUMENTS

| | | | |
|---|---|---|---|
| 4,965,747 | 10/1990 | Ohtsuka et al. | 364/519 |
| 5,001,567 | 3/1991 | Atobe | 358/300 |
| 5,043,745 | 8/1991 | Inoue et al. | 346/108 |
| 5,262,801 | 11/1993 | Serizawa | 346/108 |
| 5,373,518 | 12/1994 | Uchiyama et al. | 372/38 |
| 5,455,603 | 10/1995 | Hori et al. | 346/134 |
| 5,463,410 | 10/1995 | Uchiyama et al. | 347/133 |

Primary Examiner—Peter S. Wong
Assistant Examiner—Rajnikant B. Patel
Attorney, Agent, or Firm—Fitzpatrick, Cella, Harper & Scinto

[57] ABSTRACT

An image output control apparatus is constructed by a converter for converting first information to second information, a controller for starting an output preparing operation before the conversion of the first information of one page to the second information, a memory for holding a control value determined during the output preparing operation, a unit for temporarily stopping the output preparing operation, and a unit for restarting the output preparing operation, wherein the output preparing operation to be restarted is executed on the basis of the control value held in the memory.

19 Claims, 18 Drawing Sheets

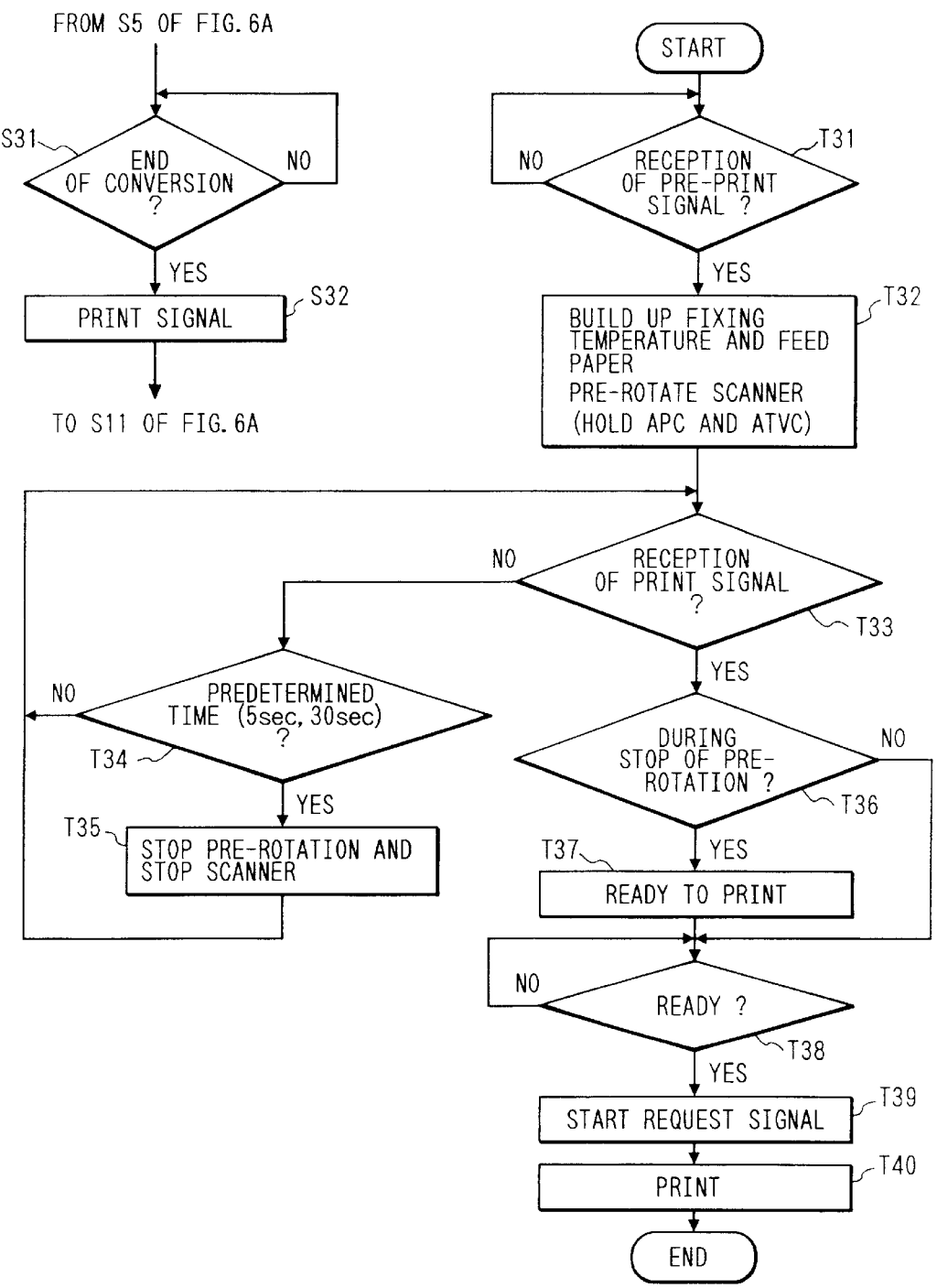

PAGE PRINTER

BACKGROUND OF THE INVENTION

1. Field of the Invention

The invention relates to a page printer using an electrophotographing system such as a laser beam printer or the like.

2. Related Background Art

Hitherto, a page printer using an electrophotographing system such as a laser beam printer or the like has a controller unit and an engine unit for electrophotography. The controller unit controls in a manner such that commands (a print command, a command to specify a printing state of the printer, and the like) regarding the printing and coded character and figure information are received by data receiving means from an external information processing apparatus such as personal computer, workstation, or the like and, after that, the code information is converted to pixel information by pixel converting means, and the pixel information is converted to raster information. The engine unit for electrophotography is constructed in a manner such that raster information is intensity modulated by a light output means such as a semiconductor laser or the like and is raster scanned onto a uniformly pre-charged photosensitive material by light modulation scanning means including a rotary polygon mirror such as a polygon mirror or the like, thereby forming an electrostatic latent image and, after that, a desired image is formed on a recording material by a well-known electrophotographing process. In this instance, in many page printers, after the coded character and figure information were received by data receiving means from the external information processing apparatus, the code information is converted to the pixel information by the pixel converting means, and after that, the printing operation of the engine unit for electrophotography is started. Therefore, after a printing command was generated from the external information processing apparatus, a time which is required to convert the code information to the pixel information, a preparation time or the like until the engine unit for electrophotography enters a printable state, and the like are serially added. There is consequently a drawback such that a time (what is called a first printing time) which is required until the printed recording material is perfectly ejected out of the page printer is long.

As a conventional technique to eliminate the drawback, in U.S. Pat. No. 5,455,603, there is disclosed an electrophotography printer in which after a controller unit received code information of one page, an engine unit for electrophotography previously starts a paper feeding operation, a recording material is set to a standby state at a predetermined standby position, and the printing operation is started after the controller unit converted the code information to the pixel information.

According to the above conventional technique, however, in the control of the engine unit for electrophotography after the code information was received, a priority is first given to only the start of the paper feeding operation and it is a main object to improve a throughput during the continuous printing operation, and nothing is considered to a time which actually contributes to a first printing time and is required for a print preparing operation of the engine unit for electrophotography. Specifically speaking, nothing is considered to: a build-up time until a rotational speed of the polygon mirror reaches a predetermined rotational speed; a time to control a light amount of a laser beam to a predetermined light amount; a time which is required to stabilize a surface potential of a photosensitive material; a time until a surface temperature of a heating roller reaches a predetermined temperature in case of using, for example, the heating roller in a heat fixing apparatus;

and the like. It has been found out that even when only the paper feeding operation is merely made fast, it is insufficient to reduce the first printing time.

Further, there is also a case where after the controller unit of the electrophotography printer unit received the code information, when the code information is converted to the pixel information, the pixel information converting time increases in dependence on the kind of code information. If the print preparing operation of the engine unit for electrophotography is continued for a period of time that is required for the information conversion, for example, there is a case where an adverse influence is exerted on the life of a driving axis of the polygon mirror, the life of the photosensitive material, and the like. In the conventional technique, however, nothing is considered with respect to this point.

For the purpose of saving energy, in recent years, a sleep mode for shutting off a current supply to a heat fixing apparatus when the electrophotography printer is in a non-printing state and for also reducing electric power consumption of the other apparatuses is often used. In this instance, although the first printing time depends on the time which is required to build up the heat fixing apparatus, in the conventional technique, nothing is considered with respect to the reduction of the first printing time from the sleep mode.

SUMMARY OF THE INVENTION

It is an object of the invention that after code information was received from an external information apparatus, by optimizing a time which is required for a print preparing operation of an engine unit for electrophotography, a first printing time is reduced and a life of each element of the engine unit for electrophotography is guaranteed.

To accomplish the above object, according to the present invention, there is provided an electrophotography printer comprising: data receiving means for receiving a command regarding the printing and coded character or figure information from another information processing apparatus; pixel converting means for converting the coded character or figure information to pixel information; raster converting means for converting the pixel information to raster data; light modulation scanning means for intensity modulating a light on the basis of the raster data and forming an electrostatic latent image onto a photosensitive material which has previously uniformly charged; developing means for visualizing the electrostatic latent image on the photosensitive material by a toner; feeding means for feeding a recording material; transfer means for transferring the toner image onto the recording material; and heat fixing means for permanently fixing the toner image on the recording material onto the recording material, wherein after the data was inputted to the data receiving means in the standby state, by starting the activation of the light modulation scanning means in accordance with a progressing situation of the pixel converting operation by the pixel converting means, the light modulation scanning means is built up earlier to thereby reduce a first printing time, and by building up the timing to build up the light modulation scanning means in accordance with the progressing situation of the pixel converting operation, it is prevented that the light modulation scanning means operates for a long time than it is needed, thereby assuring a durability.

Further, after the data was inputted to the data receiving means in the standby state, by starting the print preparing operation and by holding a control value during the image forming step which is determined during the print preparing operation, only the control steps such as control of the laser light amount, control of a voltage which is applied to a transfer roller, and the like are finished earlier, thereby enabling the first printing time to be reduced.

Further, by making the building-up operations of the rotary member for heating of the heat fixing means different in accordance with when the current supply to the power source is started and when the data is inputted to the data receiving means in the standby state in which the current supply to the heat fixing means is shut off, or by building up the heating rotary member of the heat fixing means after the data was inputted to the data receiving means in the standby state and controlling the print preparing operation in accordance with the temperature of the heating rotary member, particularly, in the case where the printer starts the printing operation from the sleep mode, the print preparing operation is controlled in accordance with the temperature of the heating rotary member which requests the longest build-up time, thereby reducing the first printing time.

BRIEF DESCRIPTION OF THE DRAWINGS

FIGS. 14A and 14B are flowcharts for explaining the operations of the controller unit and the engine unit;

DETAILED DESCRIPTION OF THE PREFERRED EMBODIMENTS

Embodiments of the present invention will now be described hereinbelow with reference to the drawings.

[Embodiment 1]

Figure 1:
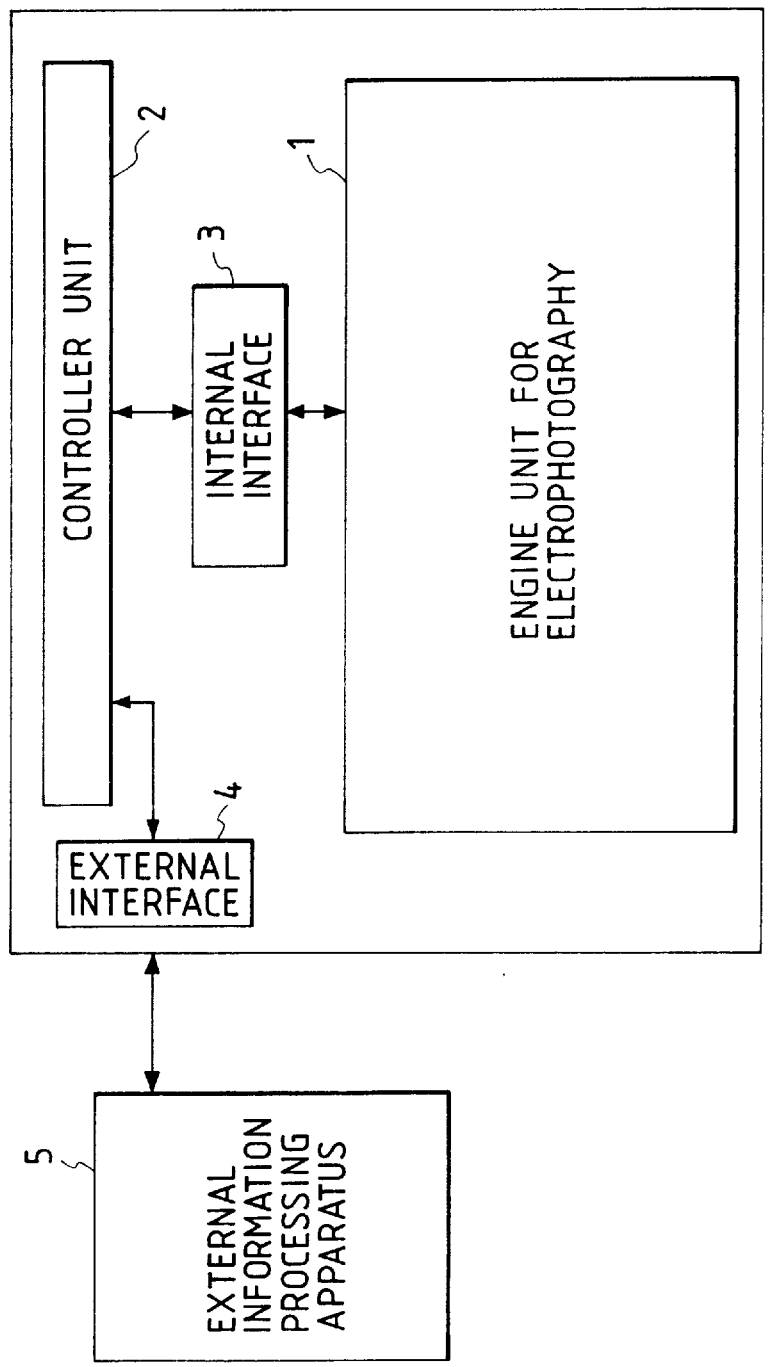
FIG. 1 is a schematic diagram of an electrophotography printer to which the invention is applied.

FIG. 1 is a constructional diagram of a main body showing an electrophotography printer according to an embodiment 1 of the invention. The electrophotography printer comprises: a controller unit 2 for receiving code data from an external information processing apparatus 5 through an external interface 4 and converting into pixel data; and an engine unit 1 for electrophotography for printing the pixel data onto a recording material by an electrophotographing process. The controller unit 2 and the engine unit 1 for electrophotography are communicated through an internal interface 3.

Figure 2:
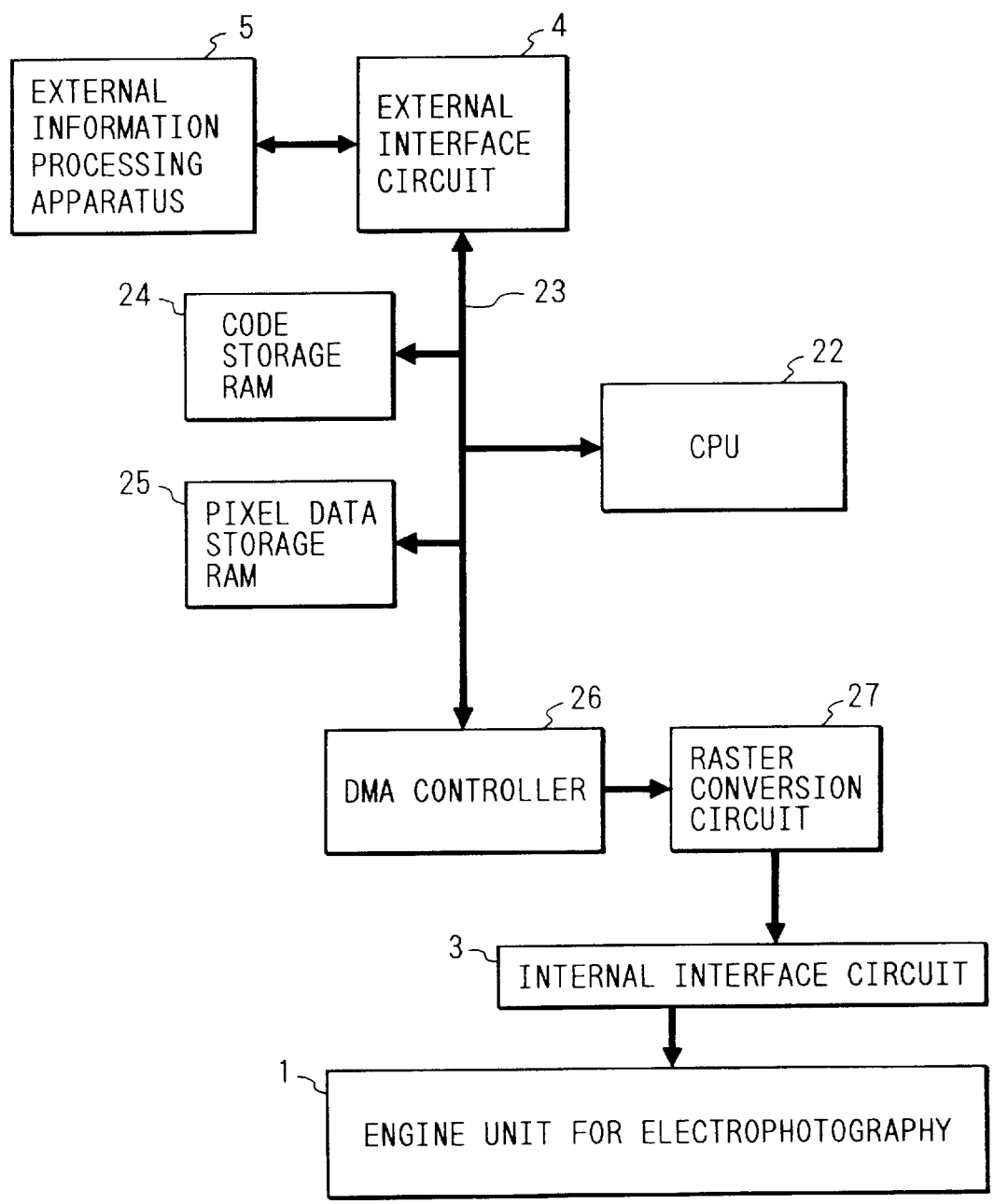
FIG. 2 is a block diagram showing a construction of a controller of the electrography printer to which the invention is applied.

FIG. 2 is a schematic block diagram for explaining the controller unit 2. The code data from the external information processing apparatus is transmitted to the controller unit 2 through an external interface (for example, Centronics RS232C). The controller unit 2 sends the code information received by the external interface 4 to a CPU 22 through an internal bus 23. The CPU 22 processes the code information to a certain extent and stores the processed code information into a code storage RAM 24 and also converts the code information to the pixel information of a dot image and stores into an RAM 25 for storing pixel data. Data stored in the pixel data storage RAM 25 is read out by a DMA controller 26 and is sent to a raster conversion circuit 27. The raster conversion circuit 27 converts the parallel pixel data received from the DMA controller 26 into the serial pixel data. The pixel data is sent to the engine unit 1 for electrophotography through the internal interface 3.

Figure 3:
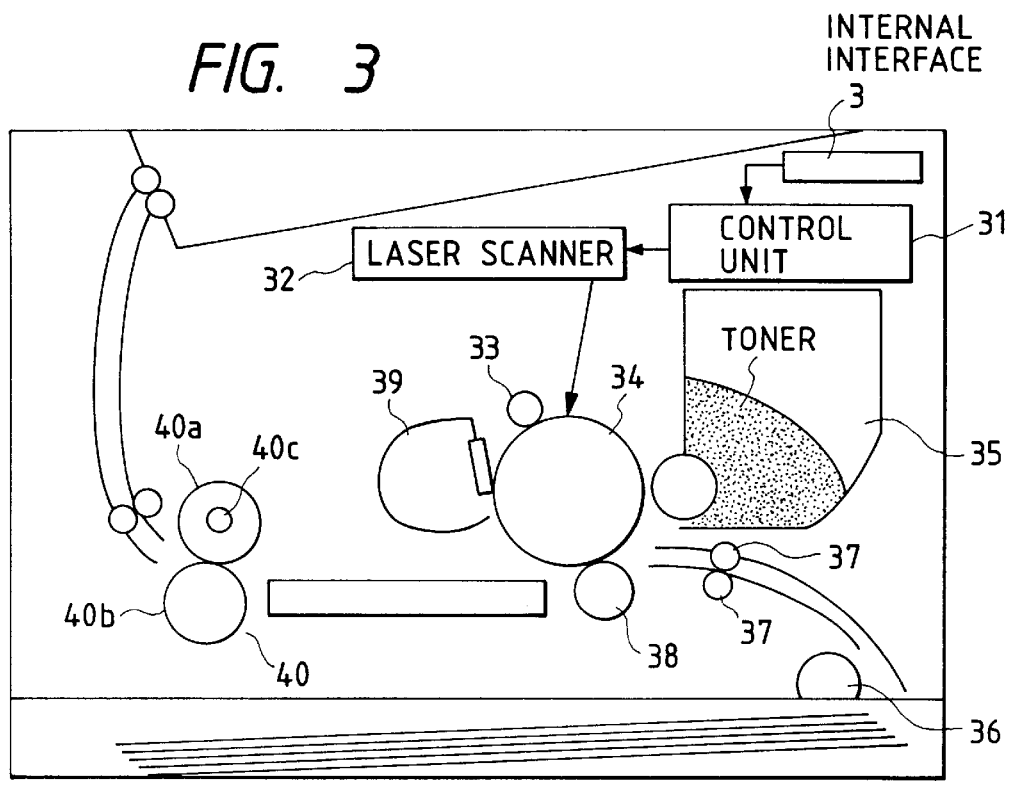
FIG. 3 is a schematic diagram of an engine unit for electrophotography of the electrophotography printer to which the invention is applied.

FIG. 3 shows a schematic cross sectional view for explaining the engine unit for electrophotography. The pixel data transmitted through the internal interface 3 is received by a control unit 31 for controlling the operation of the engine unit for electrophotography. The pixel data is partially processed and is transmitted or is directly transmitted to a laser driver (not shown), thereby modulating a semiconductor laser (not shown). The modulated laser beam is raster scanned onto a photosensitive drum 34 by a laser scanner 32 including a polygon mirror. A drum made of amorphous silicon, an organic photoconductive material, or the like can be used as a photosensitive drum 34. In the embodiment, however, the organic photoconductive material is used. The surface of the photosensitive material is uniformly charged by charging means 33 such as charging roller, corona discharge unit, or the like (in the embodiment, a charging roller for applying a high voltage in which a DC voltage is multiplexed to an AC is used). By irradiating a laser beam onto the surface of the photosensitive material, a difference between a dark portion potential and a bright portion potential occurs on the photosensitive material, so that an electrostatic latent image is formed. The electrostatic latent image is visualized to the laser irradiated portion by a developing unit 35 having a toner charged to a desired polarity on the basis of an inversion developing system for developing the toner (in the embodiment, the one-component magnetic toner of the negative polarity is inversion developed by a jumping developing system). The toner image on the photosensitive drum 34 is electrostatically transferred by a transfer roller 38 onto the recording material which was fed and conveyed to a transfer position by a feed roller 36 and a registration roller 37. The transfer remaining toner on the photosensitive drum 34 is cleaned by a cleaner 39 having cleaning means such as a cleaning blade or the like. After that, the same image forming process is repeated again. The recording material on which the toner image was transferred is conveyed to a heating roller fixing device 40 comprising a heating roller 40a having a heater 40c therein and a pressurizing roller 40*b*. The toner image is permanently fixed by the heating roller fixing device 40. After that, the recording material is ejected out of the printer apparatus.

The embodiment is characterized in that by using the electrophotography printer as mentioned above, the external information processing apparatus 5 controls in a manner such that the controller unit 2 receives the code information and the activation of the laser scanner 32 is controlled in accordance with the progressing situation of the operation to convert the code information to the pixel information by the controller unit 2 and, at the same time, the pre-rotation of the photosensitive drum is controlled. In the embodiment, a print preparing operation of the engine unit for electrophotography is controlled by the controller unit 2 for the engine unit 1 for electrophotography by using a pre-print signal (command to start the pre-rotation and to start the feeding operation) and a pre-scan signal (command to start the activation of the laser scanner).

Figure 4:
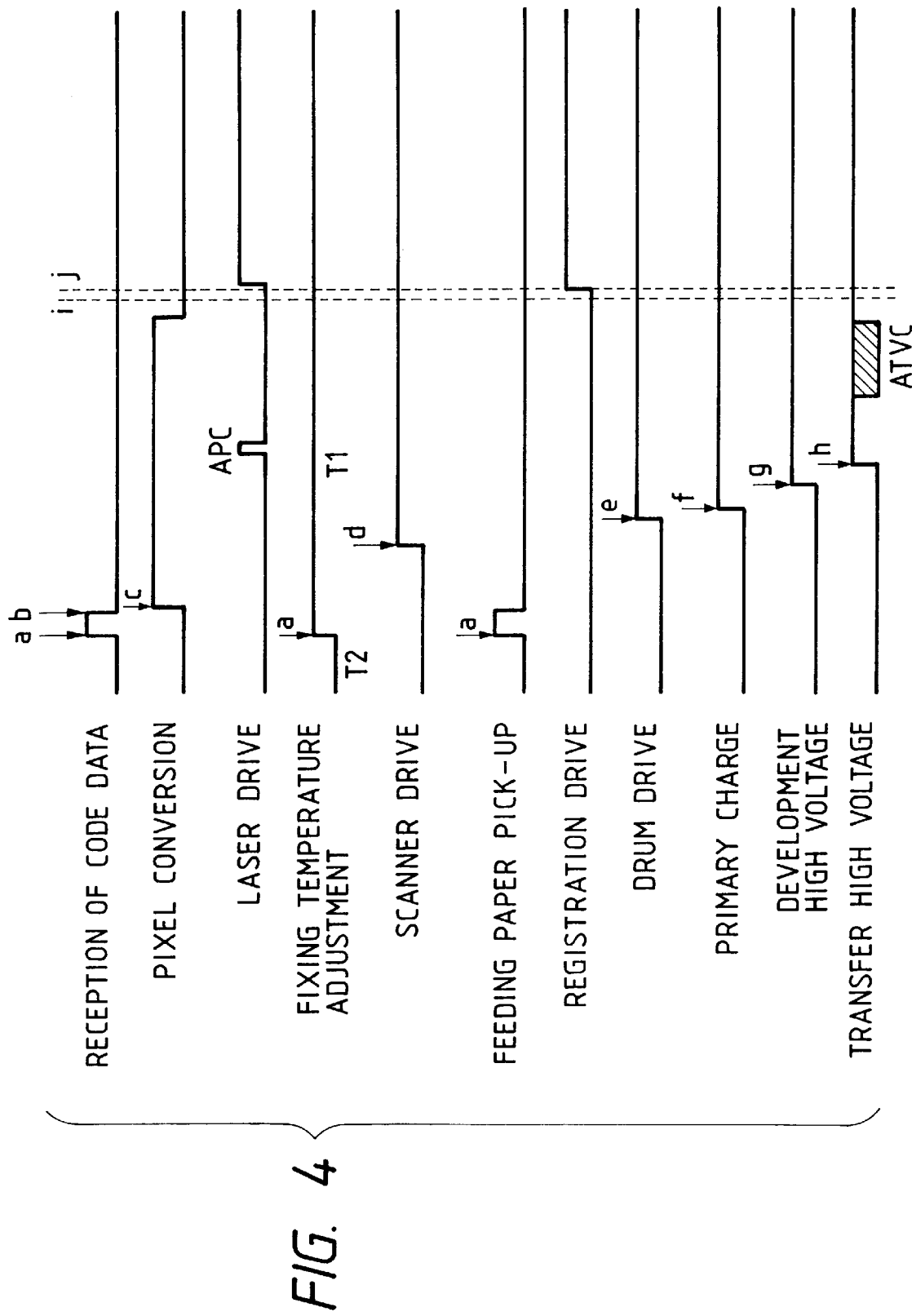
FIG. 4 is a timing chart for the electrophotography printer to explain the invention.
Figure 6A:
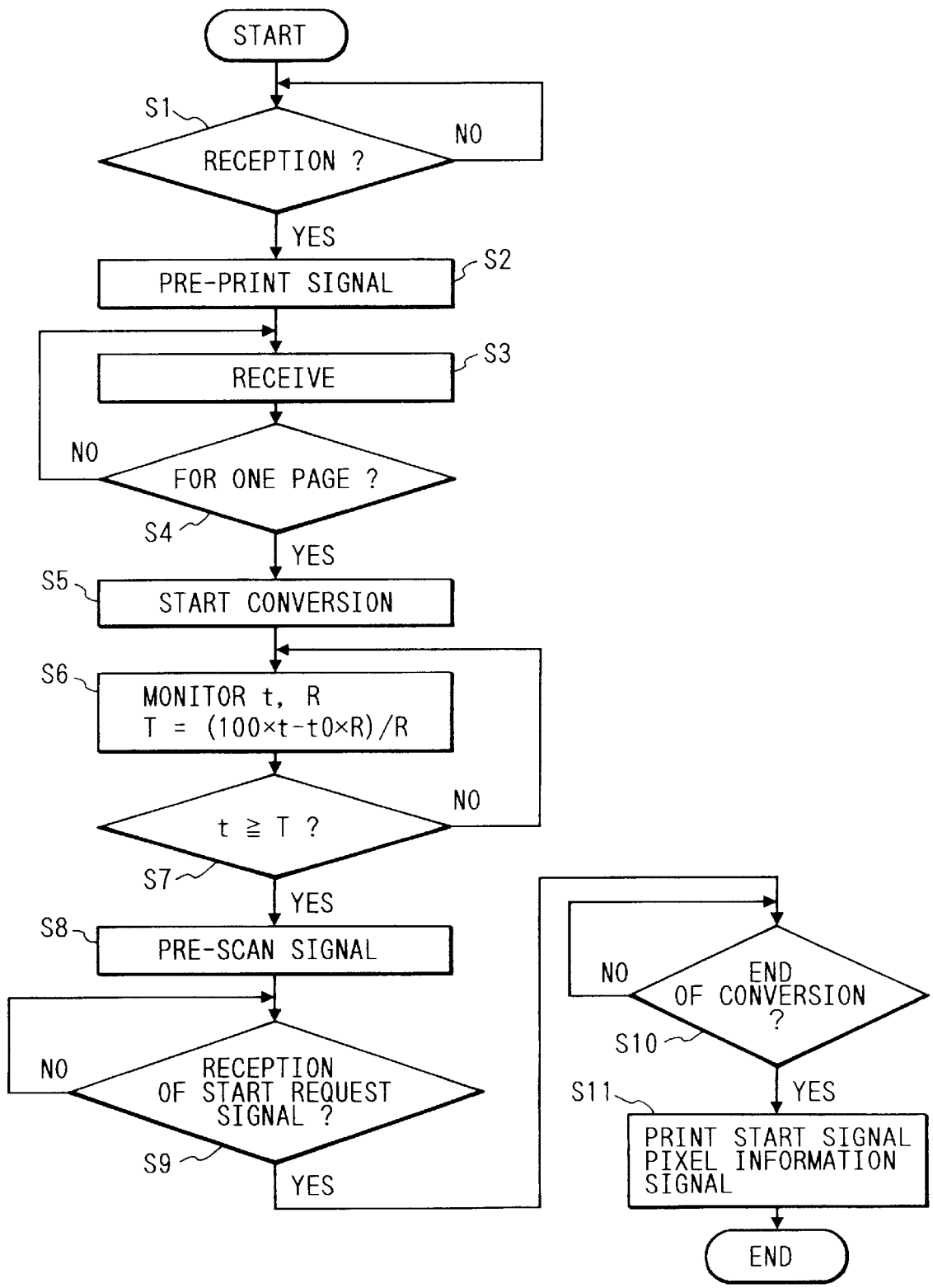
FIGS. 6A and 6B are flowcharts for explaining the operations of the controller unit and the engine unit.
Figure 6B:
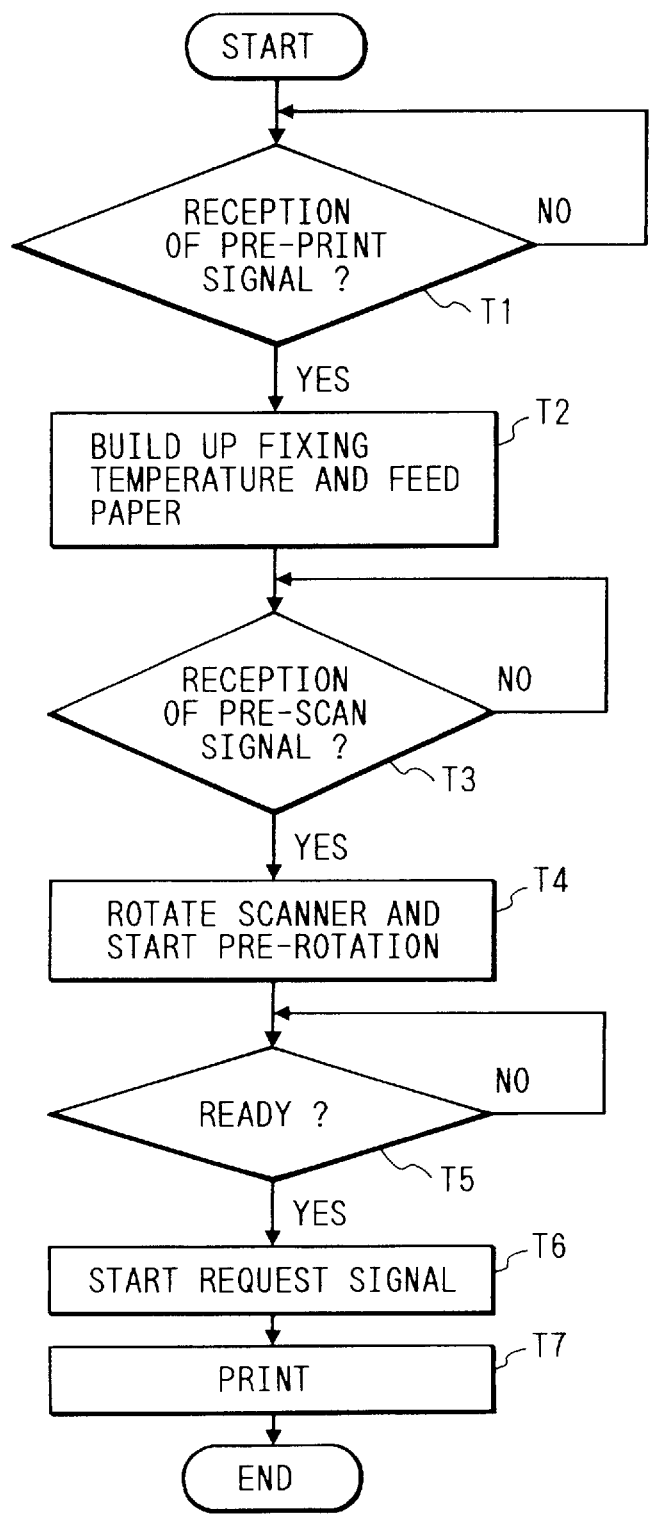

FIG. 4 shows a timing chart of the embodiment. FIG. 6A is an operation flowchart for the controller unit 2. FIG. 6B is an operation flowchart for the engine unit. At the stage [timing b (step S4)] at which the controller unit 2 has received the code information of one page, the controller unit 2 starts to convert the code information to the pixel information [timing c (S5)]. At the stage [timing a (S1)] when the code information is received by the controller unit 2, the engine unit 1 for electrophotography generates the pre-print signal (S2), thereby starting the preparing operation necessary to start the printing. The pre-print signal and the like can be also generated at the stage when the code information of one page is received (the same shall also apply to the following embodiments). The engine unit which received the pre-print signal (step T1 in FIG. 6B) starts to raise the heating roller 40*a* which was previously adjusted to a low set temperature T2 to a set temperature T1 at which the toner image on the recording material can be sufficiently fixed. The surface temperature of the heating roller 40*a* is maintained to T1. Further, the feeding roller 36 also starts the feeding operation at the same timing. The fed recording material is conveyed to the registration roller 37 and is set into a standby state by the registration roller 37 until a print start signal is generated after that. When the laser scanner 32 is activated, in accordance with the progressing situation of the pixel information converting operation in the controller unit 2, the controller unit 2 generates the pre-scan signal (S8) at a time point [timing d (S7)] when it is judged that the laser scanner 32 can be activated, thereby starting the activation of the laser scanner 32.

The engine unit 1 which received the pre-scan signal in step T3 starts to build up the rotation of the photosensitive drum 34, a primary charging high voltage, a development high voltage, a transfer high voltage, and the like at a time point when a predetermined time after the start of the rotation of the laser scanner 32 has elapsed, thereby stabilizing the surface potential of the photosensitive drum 34 (timings e, f, g, h). In this instance, an APC (Auto Power Control) to determine a drive current for driving the laser light amount by a target light amount and an ATVC (Auto Transfer Voltage Control) to decide a voltage value which is applied to the transfer roller are executed (T4). In the ATVC, a voltage value which is applied to the recording material upon transfer thereto is determined in accordance with a voltage value generated when a constant current is supplied onto the dark portion potential of the photosensitive drum. A preparation rotation to form the image is referred to as a pre-rotation. At a time point (T5) when the print preparing operation is completed, the engine unit 1 for electrophotography transmits a print start signal request signal (timing i) to the controller unit 2 (T6). The controller unit 2 which received the print start signal request signal in step S9 generates the print start signal to the engine unit 1 [timing j (S11)] at the stage when the pixel information converting operation is finished (S10). The engine unit 1 starts to feed the recording material from the registration roller 37. The laser beam is modulated in accordance with the pixel information signal which is transmitted from the controller unit 2, thereby performing the printing (T7).

Figure 5:
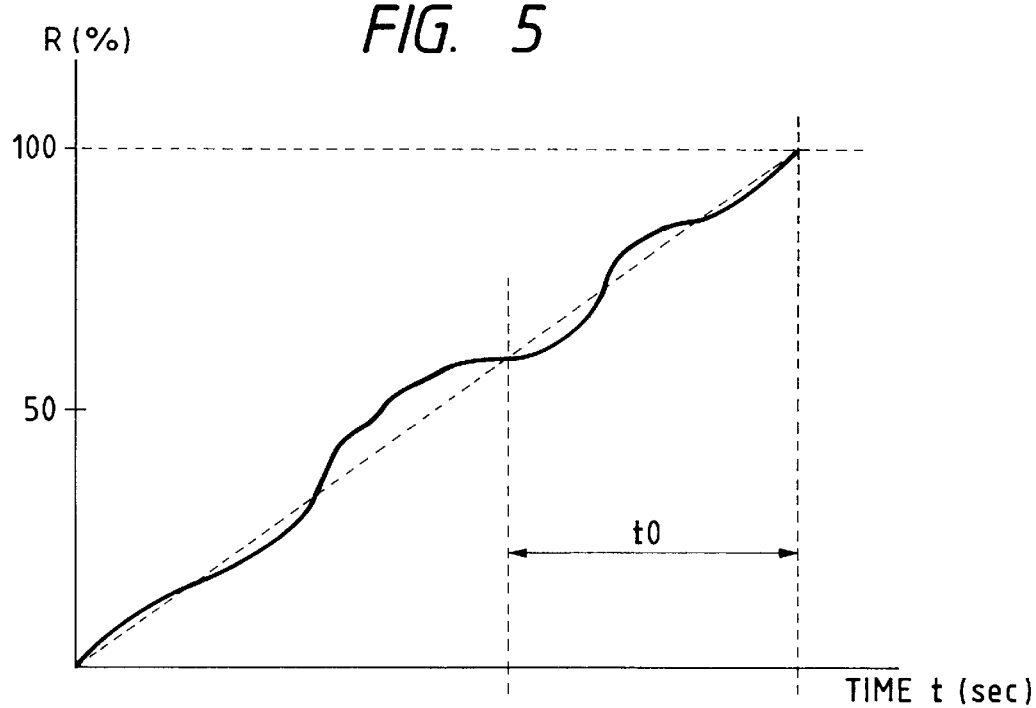
FIG. 5 is a graph for explaining a monitor of a progressing situation of a pixel conversion of a controller unit.

A method of deciding a timing for building up the laser scanner 32 in this instance will now be described with reference to FIGS. 5, 6A and 6B. In FIG. 5, an axis of abscissa indicates an elapsed time t after the CPU 22 started the operation to convert the code information into the pixel information, and an axis of ordinate indicates a ratio R (%) of an amount of information converted from the code information to an information amount of one page.

With reference to steps S6 to S8 in FIG. 6A, explanation will now be made with respect to an algorithm for deciding a timing to build up the laser scanner 32 on the basis of the relation between the elapsed time of the pixel information converting operation and the ratio R of the data pixel information converted from the code information at that time to the pixel data capacity of one page. The CPU 22 monitors the pixel conversion ratio R every predetermined time (for example, 100 msec) and presumes that the pixel conversion ratio R linearly changes with the elapse of time. The values of the elapsed time t at that time and the image ratio R are substituted to the following equation (S6).

$$T=(100 \times t - t0 \times R)/R$$

where, t0: time that is slightly longer than the time which is required for the laser scanner 32 to build up (in the embodiment, t0=5 seconds)

At a time point when t is longer than T, it is judged that the pixel converting operation is finished in t0 seconds (S7). The pre-scan signal to activate the laser scanner 32 is transmitted to the engine unit 1 (S8).

As mentioned above, by activating the laser scanner 32 in accordance with the progressing situation of the pixel converting operation, the build-up time of the laser scanner 32 which exerts a largest influence on a first printing time in the engine unit 1 can be built in the pixel information converting time of the controller unit. The first printing time can be reduced. Even in the case where it takes a long time for the pixel converting operation as in the image, the time which is required for the laser scanner 32 to rotate is actually only the time that is required to build up. Therefore, the life of the laser scanner 32 is not adversely influenced. Further, even with respect to the photosensitive drum 34 in which an influence of the life on the rotating time is larger than that on the laser scanner 32, since an end time of the pixel information conversion can be predicted according to the invention, the pre-rotation to stabilize the surface potential of the photosensitive drum 34 can be also built in the pixel information converting time of the controller unit 2. The first printing time can be fairly reduced.

The embodiment has been described with respect to the construction such that the pre-print signal and the pre-scan signal are independently transmitted by the controller unit. However, for example, it is also possible to construct in a manner such that only the pre-scan signal is transmitted from the controller unit and, with respect to the control of the heater 40c of the heating roller 40a and the paper feed control, after the pre-scan signal was transmitted, those controls are executed at proper timings on the engine unit 1 side.

[Embodiment 2]

Figure 7:
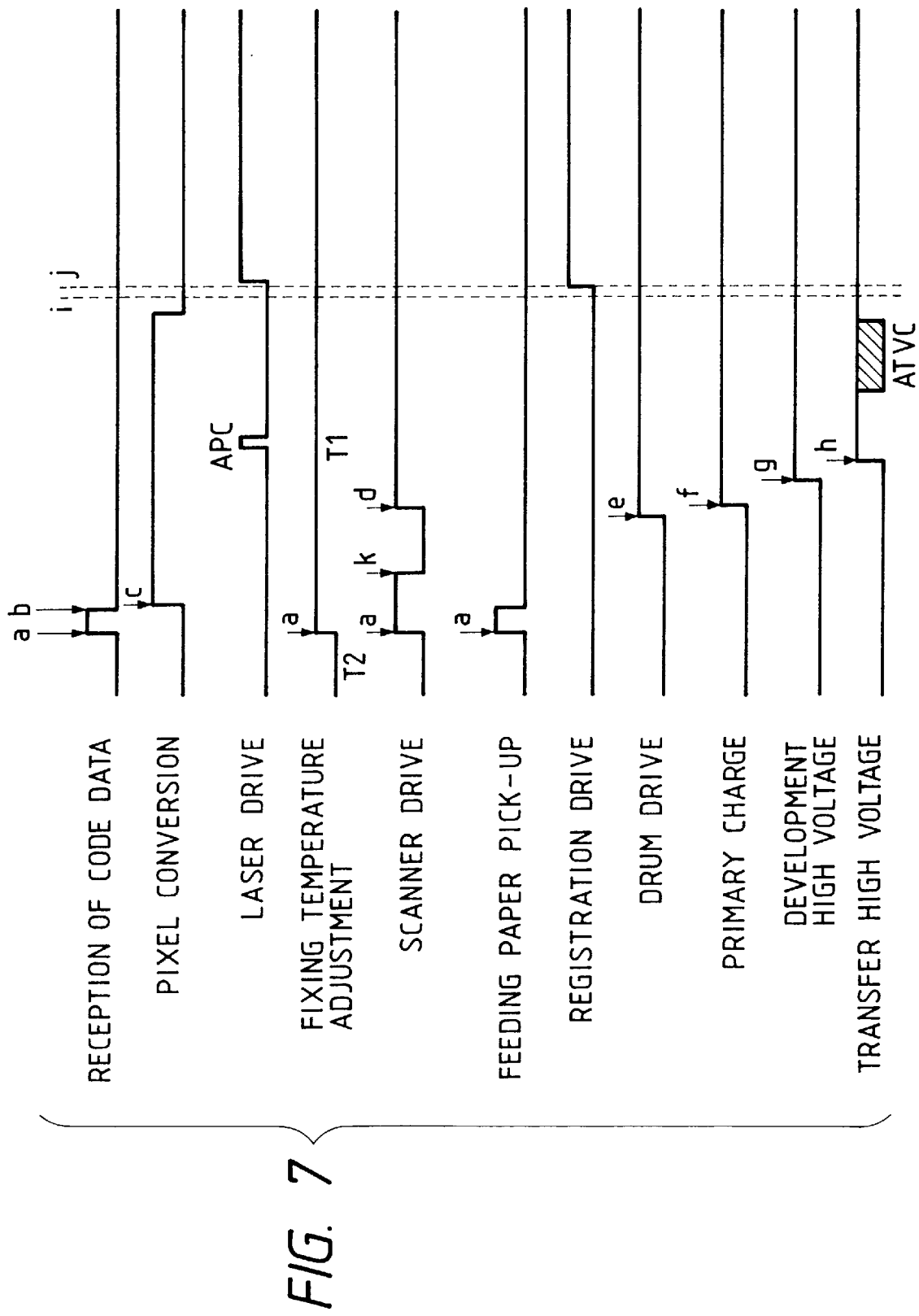
FIG. 7 is a timing chart of the electrophotography printer for explaining the invention.

FIG. 7 is a timing chart showing an embodiment 2 of the invention. Since the electrophotography printer to which the embodiment 2 is applied is similar to that in the embodiment 1, its description is omitted. The embodiment 2 has the following features. Namely, at the stage when the controller unit 2 receives the code information from the external information processing apparatus 5, the pre-print signal is sent to the engine unit 1. At this time, the engine unit 1 simultaneously executes the build-up of the heater 40c of the heating roller 40a, the build-up of the laser scanner 32, and the paper feed of the recording material. After that, when the controller 2 judges that a long time is necessary for the pixel information converting operation in accordance with the progressing situation of the pixel information converting operation in the controller unit 2, the build-up of the laser scanner 32 is once stopped and, in accordance with an algorithm similar to that of the embodiment 1, the pre-scan signal is generated in accordance with the progressing situation of the pixel information converting operation and the build-up of the laser scanner is restarted. In the embodiment 2, in addition to the pre-print signal and pre-scan signal similar to those of the embodiment 1, a pre-scan stop signal to stop the rotation of the laser scanner 32 is used.

Figure 8A:
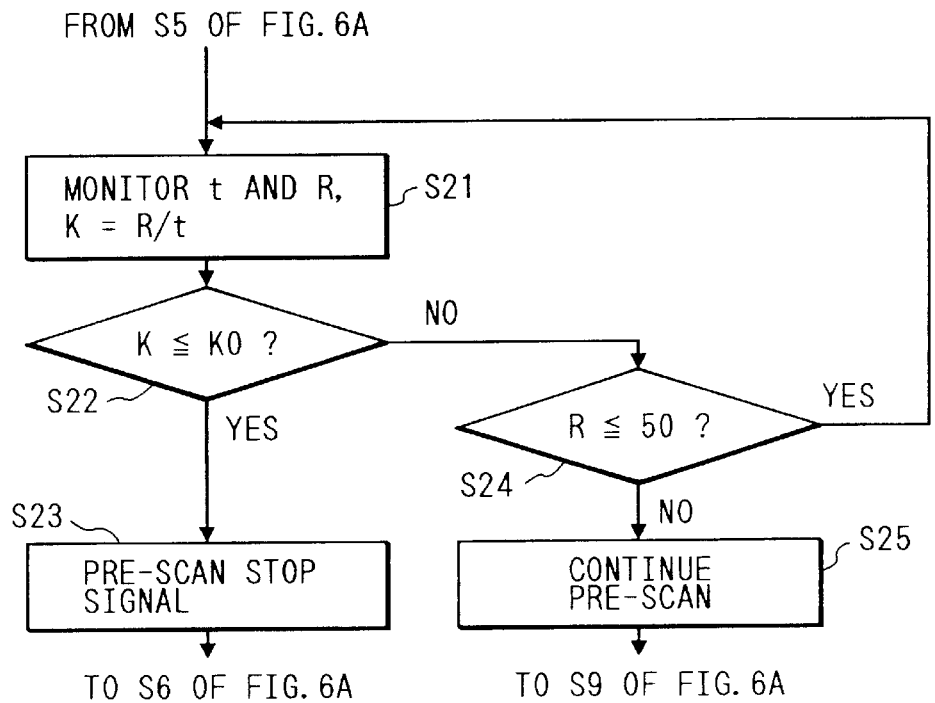
FIGS. 8A and 8B are flowcharts for explaining the operations of the controller unit and the engine unit.
Figure 8B:
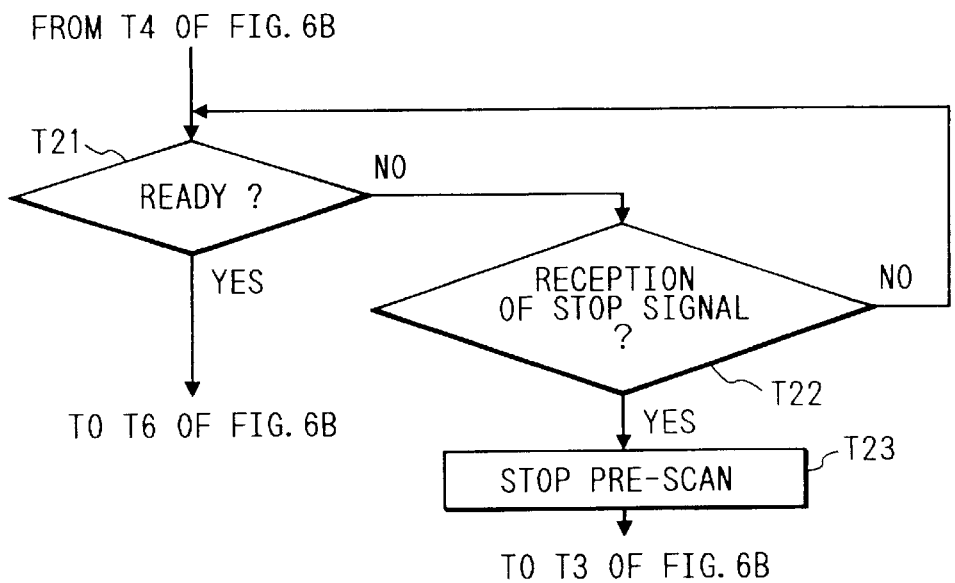

The embodiment 2 will now be described hereinbelow with reference to a timing chart of FIG. 7 and flowcharts of FIGS. 8A and 8B. In the flowcharts of FIGS. 8A and 8B, processing steps different from those of FIGS. 6A and 6B are shown. At the stage [timing b (S4)] when the controller unit 2 has received the code information of the first page, the controller unit 2 starts to convert the code information to the pixel information [timing c (S5)]. On the other hand, in the engine unit 1, at the stage [timing a (S1)] when the code information is received by the controller unit 2, the controller unit 2 generates the pre-print signal (S2), thereby starting to build up the heating roller 40a which was previously adjusted to the set temperature T2 to the low set temperature T1 at which the toner image on the recording material can be sufficiently fixed. The surface temperature of the heating roller 40a is set to T1. In the embodiment, the pre-scan signal to build up the laser scanner 32 is transmitted at the same timing as that of the pre-print signal. The embodiment 2 differs from the embodiment 1 with respect to the following points. Namely, in accordance with an algorithm as shown in steps S21 to S25 of the flowchart of FIG. 8A, when it is judged that the pixel information converting operation in the controller unit 2 needs a long time (YES in step S22), the build-up of the laser scanner 32 is once stopped by a pre-scan stop signal [timing k (S24, T22, T23)]. After that, in accordance with the progressing situation of the pixel information converting operation, at the time point (timing d) when the controller unit 2 again judges that the laser scanner 32 can be built up, the pre-scan signal is again transmitted (S8), thereby starting to build up.

In a manner similar to the heating roller 40a, the feed roller 36 starts the paper feeding operation (T2) in accordance with the pre-print signal (pre-scan signal) transmitted from the controller unit 2 at the stage [timing a (T1)] when the code information is received by the controller unit 2. The recording material which was fed is conveyed to the registration roller 37 and is held in a standby state by the registration roller 37 until the print start signal is transmitted later. In the case where the laser scanner 32 continuously rotates at a time point of the elapse of a predetermined time after the start of the rotation of the laser scanner, the build-up of each of the primary charging voltage, development high voltage, transfer high voltage, and the like is started at their timings (timings e, f, g, h), thereby stabilizing the surface potential of the photosensitive drum 34 (T4).

At a time point (T21) when the print preparing operation is completed, the engine unit 1 transmits the print start signal request signal (timing i) to the controller unit 2 (T6). At the stage at which the controller unit 2 finished the pixel information converting operation, the print start signal is transmitted to the engine unit 1 (timing j). At this stage, the engine unit 1 starts to feed the recording material from the registration roller 37 and modulates the laser beam in accordance with the pixel information signal which is transmitted from the controller unit 2, thereby printing (T7).

Steps S21 to S25 in FIG. 8A relate to a flowchart showing an algorithm for transmitting the pre-scan stop signal of the laser scanner by the controller unit. In a manner similar to the embodiment 1, explanation will now be made with respect to an algorithm for deciding the timing to build up the laser scanner 32 on the basis of the elapsed time of the pixel information converting operation and the ratio R of the data pixel information converted from the code information at that time to the pixel data capacity of one page.

The CPU 22 monitors the image conversion ratio R every predetermined time (for example, 100 seconds) after the elapse of a predetermined time (for instance, 1 second) and obtains an inclination K=R/t of the elapsed time t and image conversion ratio R at that time (S21) on the assumption that the image conversion ratio R linearly changes in accordance with the elapsed time. When it is judged that a value of K is equal to or smaller than a predetermined inclination K0 (for example, K0=100/t0→t0 is set to a time which is slightly longer than the time which is required for the laser scanner to build up, in the embodiment, 5 seconds), the CPU 22 transmits a pre-scan stop signal to the engine unit 1 (S22, S23). In the other cases, the pre-scan is continued and the same processing flow is repeated until the image conversion ratio R exceeds a predetermined value (for example, 50% or more) after the elapse of a predetermined time (S22, S24, S25).

When the pre-scan stop signal is transmitted to the engine unit 1, in a manner similar to the embodiment 1 (refer to FIGS. 6A and 6B), the CPU 22 substitutes the values of the image conversion ratio R and the elapsed time into the equation $$T=(100 \times t - t0 \times R)/R$$

for a predetermined time (S6 in FIG. 6A). At a time point when T is larger than t, it is judged that the image converting operation is finished within t0 and the pre-scan signal to activate the laser scanner is again transmitted to the engine unit (S7, S8).

By performing the control as mentioned above, not only operations and effects similar to those in the embodiment 1 are obtained but also there are the following advantages. Namely, since the laser scanner is also previously activated, particularly, for code data such that the image converting operation is finished early, a time which is required to judge whether the activation of the laser scanner is started or not can be saved, so that the first printing time can be further reduced. The embodiment 2 has been described with respect to the construction in which the pre-print signal and pre-scan signal have independently been transmitted from the controller unit. However, for example, it is also possible to construct in a manner such that only the pre-scan signal is transmitted from the controller unit and, with respect to the heater control of the other heating roller and the paper feed control, after the pre-scan signal was transmitted, the above controls can be also performed at proper timings on the engine unit side. In the embodiment 2, the controller unit executes each control at a timing after completion of the reception of the code data from the external information processing apparatus. However, for example, by controlling on the basis of a command to designate the printing state prior to the code data, the laser scanner or the like can be built up at an early timing, so that the operation and effects of the invention can be further effectively obtained.

[Embodiment 3]

Figure 9:
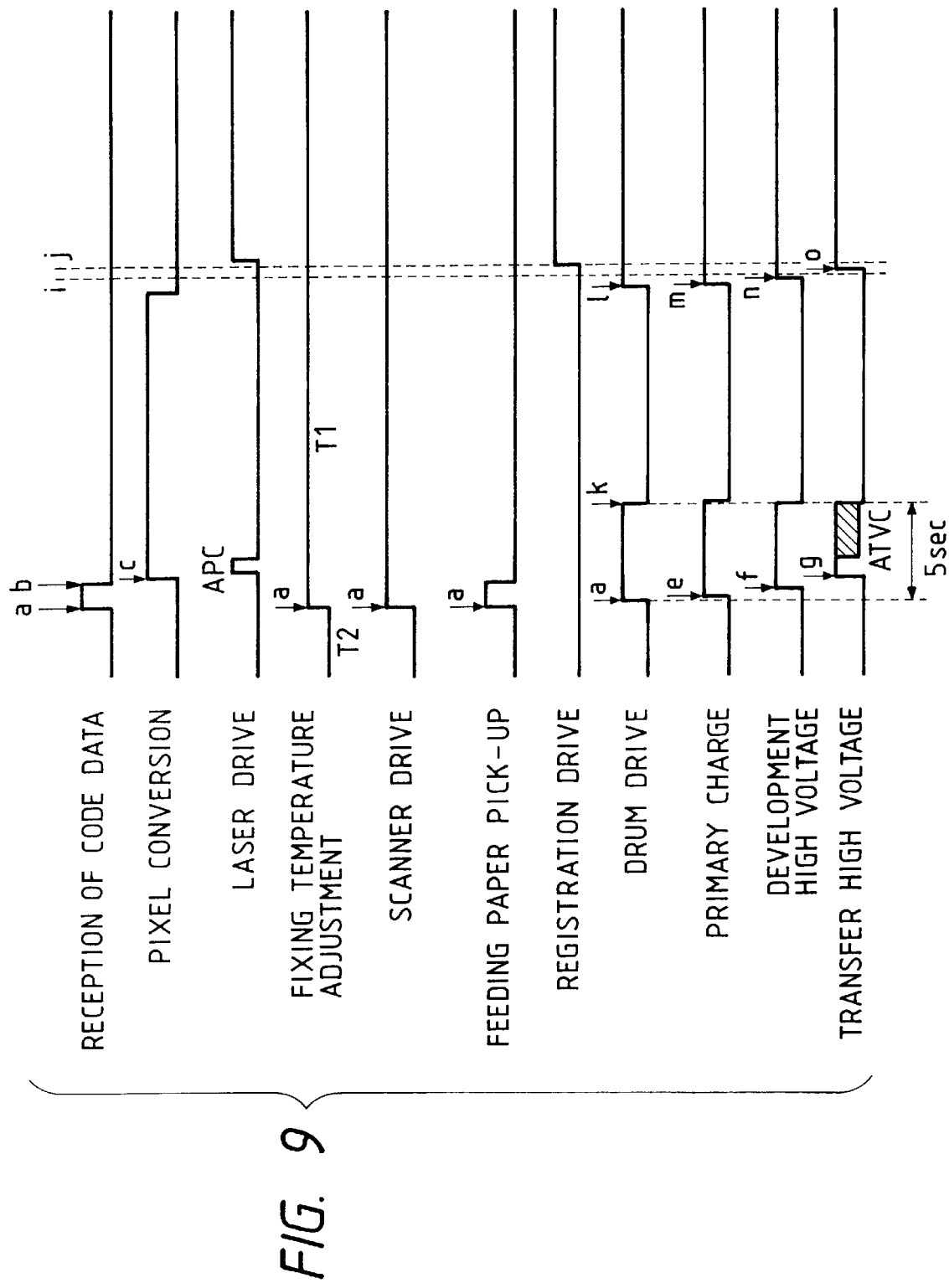
FIG. 9 is a timing chart of the electrophotography printer for explaining the invention.

FIG. 9 is a timing chart showing an embodiment 3 of the invention. FIGS. 14A and 14B are control flowcharts for the engine unit 1. Since an electrophotography printer to which the embodiment 3 is applied is similar to those in the embodiments 1 and 2, its description is omitted. In the embodiment 3, the progressing situation of the pixel information converting operation is not monitored in order to reduce a burden on the CPU 22 of the controller unit 2. At a stage when the controller unit 2 receives the code information from the external information processing apparatus 5, the pre-print signal is sent to the engine unit 1. The laser scanner 32 is built up by the pre-print signal. Further, the pre-rotation is started simultaneously with the start of the paper feed. The rotation of the photosensitive drum 34, primary charge high voltage, development high voltage, and transfer high voltage are sequentially built up at predetermined timings. Further, the laser APC and transfer ATVC are executed and control values at this time are held. When it takes a long time to finish the pixel information converting operation, the pre-rotation is first finished after the elapse of a predetermined time and the rotation of the photosensitive drum is stopped. Subsequently, the rotation of the scanner of the laser scanner 32 is stopped by data that is later than the above timing. At a time point when the pixel information converting operation is finished, the print signal is transmitted from the controller unit 2 to the engine unit 1. On the basis of the print signal, the engine unit 1 again builds up the interrupted operation by the pre-print signal. When the print preparing operation is completed, the print start signal request signal is transmitted to the controller unit 2. After that, the printing to the recording material is executed by a sequence similar to those of the embodiments 1 and 2. Since the pixel information converting operation has already been finished, the controller unit 2 which received the print start signal request signal immediately generates the print start signal.

The embodiment 3 will be described further in detail hereinbelow with reference to a timing chart of FIG. 9 and flowcharts of FIGS. 14A and 14B. At a stage when the code information of the first page is received to the controller unit 2 (timing b), the controller unit 2 starts to convert the code information to the pixel information (timing c). In the engine unit 1, at a stage when the code information is received by the controller unit 2 (timing a), the heating roller 40a which was previously adjusted to the low set temperature T2 by the pre-print signal (T31) which is generated from the controller unit 2 is started to be built up to the set temperature T1 at which the toner image on the recording material can be sufficiently fixed. The surface temperature of the heating roller 40a is maintained at T1. Further, although the laser scanner 32 is built up at the same timing, when the pixel information converting operation in the controller unit elapses by a predetermined time or more [in the embodiment, 30 seconds (T34)], the rotation of the laser scanner 32 is automatically stopped. After that, at a stage when the pixel information converting operation is finished (S31), the print signal is transmitted (S32), thereby starting to build up the laser scanner 32 (S37). The mode to stop the rotation of the laser scanner 32 when the pixel information converting operation continues for a predetermined time is not shown in FIG. 9. In a manner similar to the heating roller 40a, at a stage when the code information is received by the controller unit 2 (timing a), the paper feed roller 36 starts the paper feeding operation in response to the pre-print signal transmitted from the controller unit 2. The fed recording material is conveyed to the registration roller 37 and is held in a standby state by the registration roller section until the print start signal is transmitted after that.

The photosensitive drum 34 also starts the rotation at the same timing as the paper feeding operation and sequentially starts to build up the primary charge high voltage, development high voltage, and transfer high voltage (timings e, f, g). The surface potential of the photosensitive drum is stabilized and, at the same time, the laser APC and transfer ATVC are executed (T32). After that, when it takes a long time for the pixel information converting operation in the controller unit 2, at a time point when a predetermined time (in the embodiment, 5 seconds) elapses from the start of the pre-rotation (T34), the rotation of the photosensitive drum 34 is stopped. The recording material is held in the standby state until the print signal is transmitted from the controller unit 2 [timing k (T35)]. After that, at a stage of the completion of the pixel information converting operation, at a time point when the print signal is transmitted from the controller unit 2 [timing i (T33)], the rotation of the photosensitive drum 34 is restarted and the primary charge high voltage, development high voltage, and transfer high voltage are sequentially started to be built up [timings m, n, o (T37)], thereby stabilizing the surface potential of the photosensitive drum. In this instance, the laser APC and transfer ATVC are not executed but the control values in the pre-rotation are used as they are. When the print preparing operation is completed (T38), the engine unit 1 transmits the print start signal request signal (timing i) to the controller unit 2 (T39). At a stage when the controller unit transmits the print start signal to the engine unit (timing j), the engine unit 1 starts to feed the recording material from the registration roller 37 and converts the laser beam in accordance with the pixel information signal which is transmitted from the controller unit 2, thereby printing (T40).

By executing the timing control as mentioned above, the laser scanner 32 having a relatively long life for the rotating time is unconditionally rotated, for instance, for 30 seconds by the pre-print signal. When the pixel information converting operation is finished for such a period of time, the laser scanner soon enters a state in which the printing can be started. Therefore, the rotation in response to the pre-print signal is made effective for almost of the image information, so that the first printing time can be reduced.

On the other hand, the life of the photosensitive drum 34 for the rotating time is fairly influenced. For example, it is impossible to rotate the drum 34 for 30 seconds every print as in the laser scanner 32. Therefore, when the pixel information converting time cannot be predicted, hitherto, it is necessary to start the pre-rotation synchronously with the print signal which is transmitted from the controller unit 2 after completion of the pixel information conversion, so that the first printing time increases in dependence on the pre-rotating time. However, according to the embodiment 3, the pre-rotating time can be reduced into ½ as compared with the conventional one by the method such that the pre-rotation is once executed for only a predetermined time synchronously with the pre-print signal, the control values of the laser APC and transfer ATVC at that time are held, the photosensitive drum 34 is stopped after that, the pre-rotation is restarted at the time point when the print signal is transmitted, and at this stage, the laser APC and transfer ATVC which largely exert an influence on the pre-rotating time are omitted. (For example, in the printer whose photosensitive drum peripheral speed is equal to 50 mm/sec, as a time which is required to stabilize the surface potential of the photosensitive drum, it is sufficient to use the rotating time of one circumference of the photosensitive drum and this time is equal to about 2 seconds in case of the photosensitive drum having an outer diameter of 30 mm.) A time which is required for the laser APC is generally set to about 200 to 300 msec. A time which is required for the transfer ATVC is equal to the rotating time of one circumference or more of the transfer roller and a time of about 1.5 seconds is necessary in the case where the outer diameter of the transfer roller is equal to 20 mm. Therefore, the reduced time of the pre-rotation lies within a range from about 1.7 to 1.8 seconds. Consequently, the pre-rotating time can be reduced into ½. Therefore, the time for the print preparing operation after the print signal was transmitted can be reduced. The reduction of the first printing time can be accomplished even if the photosensitive drum 34 is not rotated for a long time.

[Embodiment 4]

Figure 10:
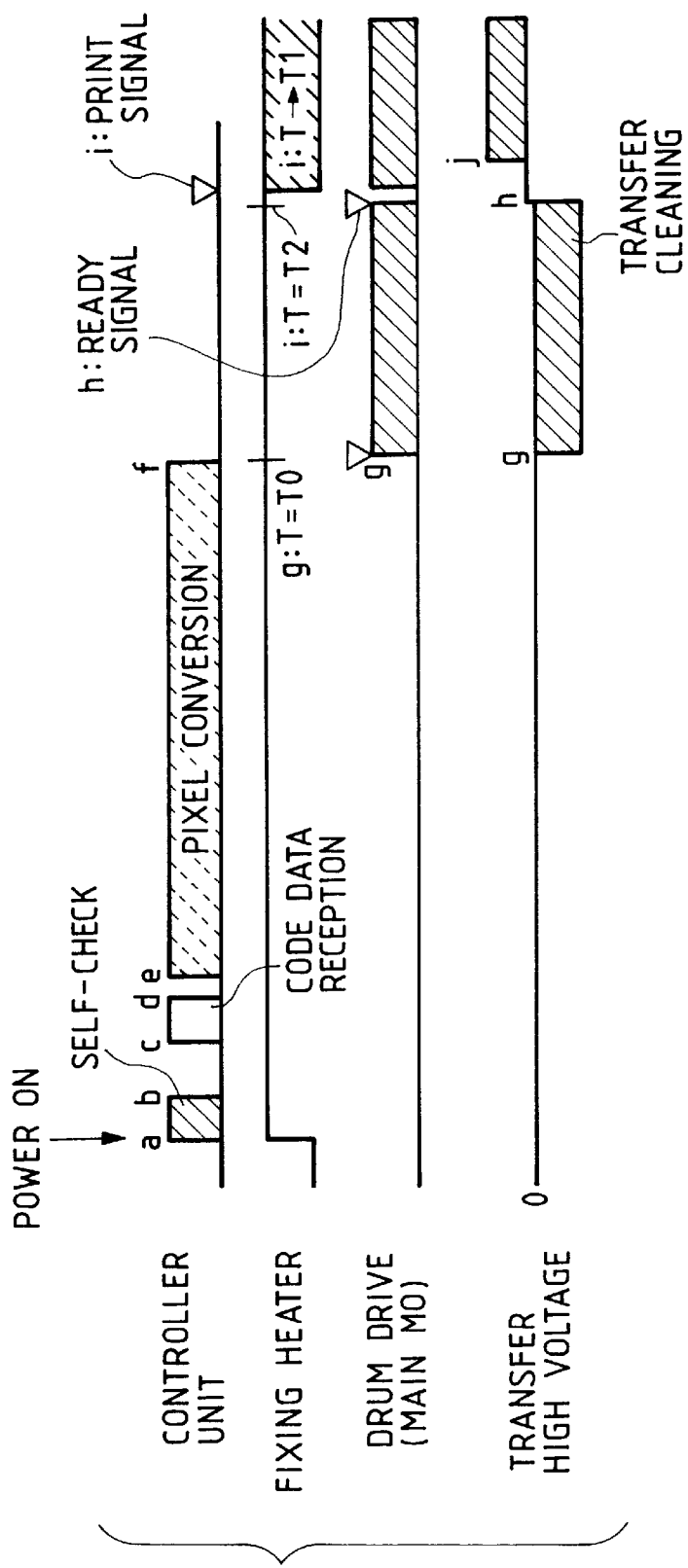
FIG. 10 is a timing chart of the electrophotography printer for explaining the invention.

FIG. 10 is a timing chart showing the embodiment 4 of the invention. Since an electrophotography printer to which the embodiment 4 is applied is similar to those of the embodiments 1 to 3, its description is omitted. The embodiment 4 relates to the reduction of the first printing time in case (wake-up mode) of starting the printing from what is called a sleep mode in which the current supply to the heating roller fixing device 40 is perfectly shut off in the standby state. A build-up sequence of the heating roller fixing device 40 in the wake-up mode is made different from a build-up sequence after another timing of the printer reset such as a timing after the turn-on of a power source or after a jam process. When the heating roller fixing device 40 is built up in the wake-up mode, the heating roller 40a and pressurizing roller 40b are maintained in the stop state until the signal from the controller unit 2 is received. On the other hand, upon building up after the printer preset like after the turn-on of the power source or after the jam process, the heating rotary member 40a and the pressurizing rotary member 40b are rotated in dependence on the temperature of the heating rotary member 40a or the elapsed time after the turn-on of the power source. In the embodiment 4, the engine unit 1 accepts only a wake-up signal (a command for starting the current supply to the heater and raising the heating roller temperature) among the signals from the controller unit 2 for a period of time during which a ready signal is not transmitted. After the ready signal was transmitted, the print preparing operation of the engine unit 1 is started by the pre-print signal and the print signal from the controller unit 2 in accordance with the progressing situation of the pixel information converting operation.

The embodiment 4 will now be described hereinbelow with reference to timing charts of FIGS. 10 and 11. FIG. 10 shows a sequence to build up after the printer reset such as after the turn-on of a power source and after a jam process. After the power source was turned on, the engine unit 1 automatically starts the current supply to the heating roller 40a (timing a) and starts to raise the heating roller temperature T. In this instance, the controller unit 2 executes a self check (timings a, b) and, after that, waits for the ready signal from the engine unit 1. In this instance, when the image information is received from the external information processing apparatus 5 (timings c, d), the controller unit 2 executes the pixel information converting operation (timings e and f). However, no command is transmitted to the engine unit 1 until the ready signal is received.

At a time point when the temperature of the heating roller 40a is set to the predetermined temperature T0 lower than a ready temperature, the engine unit 1 starts to drive a main motor and starts the rotation of each of the photosensitive drum 34, transfer roller 38, heating roller 40a, and pressurizing roller 40b (timing g). It is a main object of the rotation to clean the toner deposited on the transfer roller 38 due to the occurrence of a jam. A bias of the same polarity as that of the toner is applied to the transfer roller 38. This is because there is also considered a situation such that when a jam occurs, there is a case where the toner to be inherently transferred to the recording material is deposited onto the transfer roller 38 because the recording material doesn't reach the transfer portion and the power source is once shut off in dependence on the processing method of the user after completion of the jam process. Therefore, the apparatus is shifted to this mode irrespective of the timing after the jam process or after the turn-on of the power source. After completion of the cleaning rotation, at a time point when the heating roller 40a is returned to the temperature at which the toner on the recording material can be fixed, the ready signal is transmitted to the controller unit 2 (timing h). Since the image forming operation after that is similar to that upon wake-up, it will be explained later.

Figure 11:
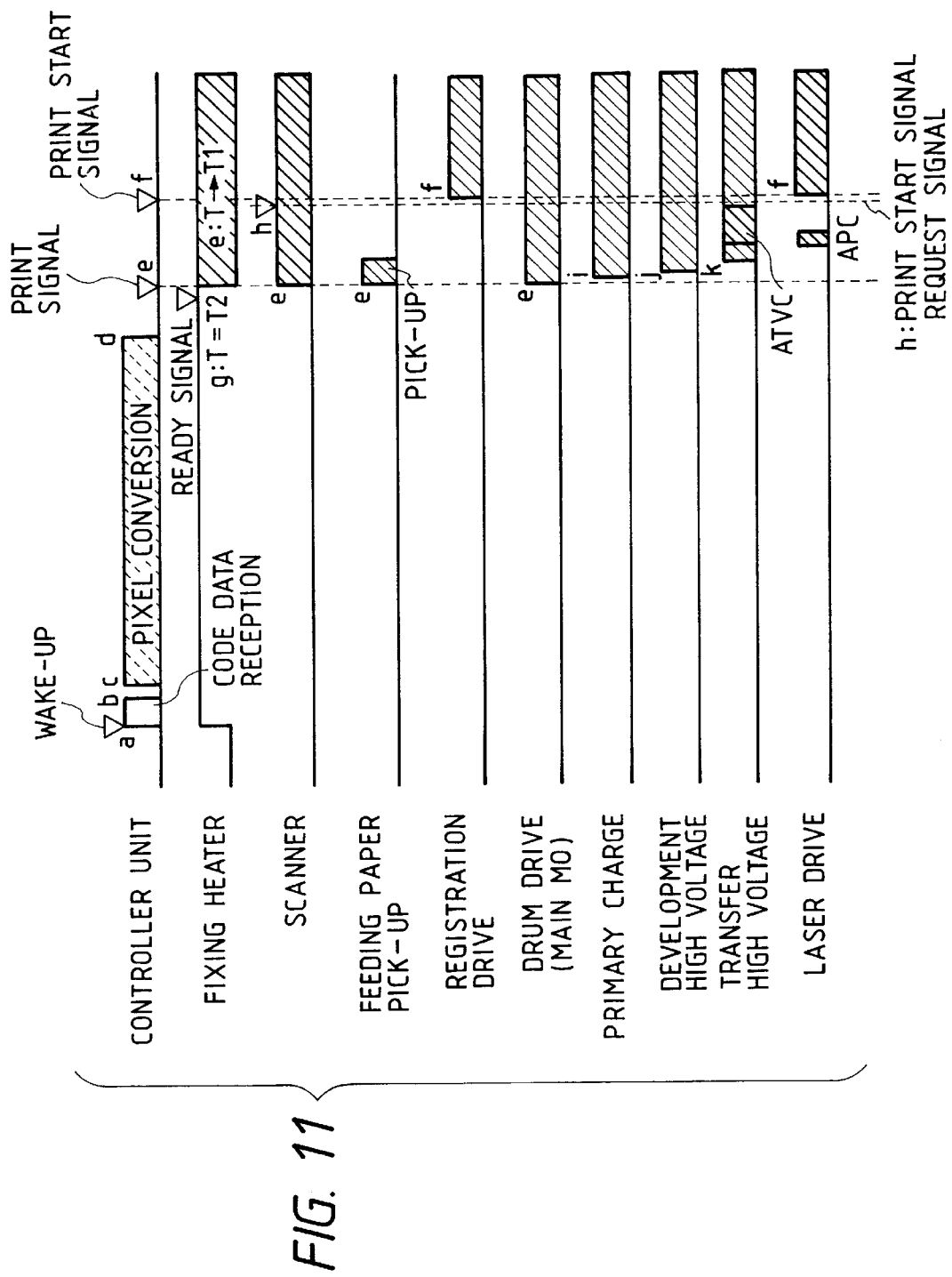
FIG. 11 is a timing chart of the electrophotography printer for explaining the invention.

FIG. 11 shows a timing chart upon wake-up. At a stage when the code information is received from the external information processing apparatus 5 (S41), the controller unit 2 transmits a wake-up signal to the engine unit 1 [timing a (S42)]. In response to the wake-up signal, the engine unit starts the current supply to the heater of the heating roller 40a and raises the temperature (T41, T42). The controller unit 2 which received the code information of one page (S43, S44) starts to convert the code information to the pixel information [timing c (S45)]. However, since the temperature of the heating roller 40a is still low, the engine unit 1 cannot accept the command from the controller unit 2. The engine unit 1 maintains the stop state until the heating roller 40a reaches a predetermined temperature at which the ready signal is transmitted (S46). This is because since the build-up sequence after the turn-on of the power source and after the jam reset is used, there is no possibility such that the toner is deposited to the transfer roller 38 at the time of the wake-up. Subsequently, at a time point when the temperature of the heating roller 40a reaches the predetermined temperature, the ready signal is transmitted, thereby informing a fact that the command from the controller unit 2 can be accepted [timing g (T44)]. When the ready signal is received, the controller unit 2 transmits the print signal [timing e (S47, S49)] in the case where the pixel information converting operation has been finished. The engine unit 1 starts the print preparing operation such as build-up of the rotation of the laser scanner 32, paper feeding operation of the recording material, pre-rotation of the photosensitive drum 34, and the like [timings e, i, j, k (T37)].

After completion of the print preparing operation, the print start signal request signal is transmitted [timing h (T38, T39)]. The printing to the recording material is started by the print start signal (timing f). When the engine unit 1 enters the ready state, if the controller unit doesn't finish the pixel information converting operation, the pre-print signal is outputted, thereby starting a series of print preparing operations (S47, S48). The subsequent operations are executed in a manner similar to the embodiment 3.

By controlling the printing operation of the electrophotography printer at the timings as mentioned above, an effect to reduce the first printing time is obtained in a manner similar to the above embodiments. Further, at the time of the wake-up, since the cleaning rotation of the transfer roller as in the ordinary case of the power-on is not executed, the heat of the heating roller is not absorbed to the pressurizing roller when the heating roller rotates. Therefore, the temperature rises earlier than the ordinary case. The time until the ready signal is transmitted after the wake-up signal was received can be reduced. The total first printing time can be reduced.

[Embodiment 5]

Figure 12:
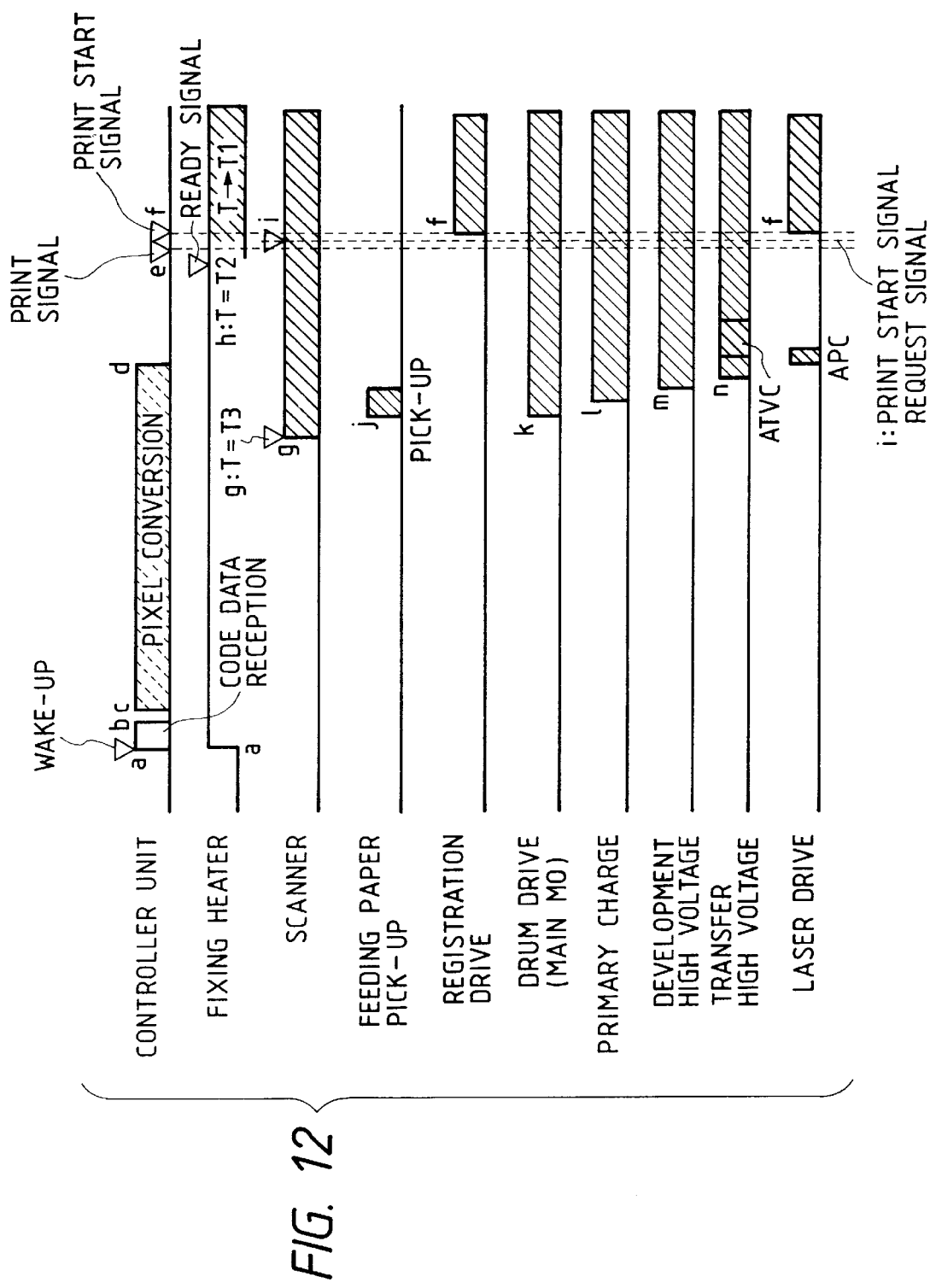
FIG. 12 is a timing chart of the electrophotography printer for explaining the invention.

FIG. 12 is a timing chart showing the embodiment 5 of the invention. Since an electrophotography printer to which the embodiment 5 is applied is similar to those of the embodiments 1 to 4, its description is omitted. The embodiment relates to the reduction of the first printing time in case (wake-up mode) of starting the printing in what is called a sleep mode in which the current supply to the heating roller fixing device 40 is perfectly shut off in the standby state. The heating roller fixing device 40 is built up in the wake-up mode and at a stage when the temperature of the heating roller 40a reaches a predetermined temperature, the activation of the laser scanner 32, paper feed of the recording material, and pre-rotation of the photosensitive drum 34 are sequentially executed. At a time point when the temperature of the heating roller 40a reaches the temperature at which the toner on the recording material can be fixed, the above series of print preparing operations are completed.

Figure 15A:
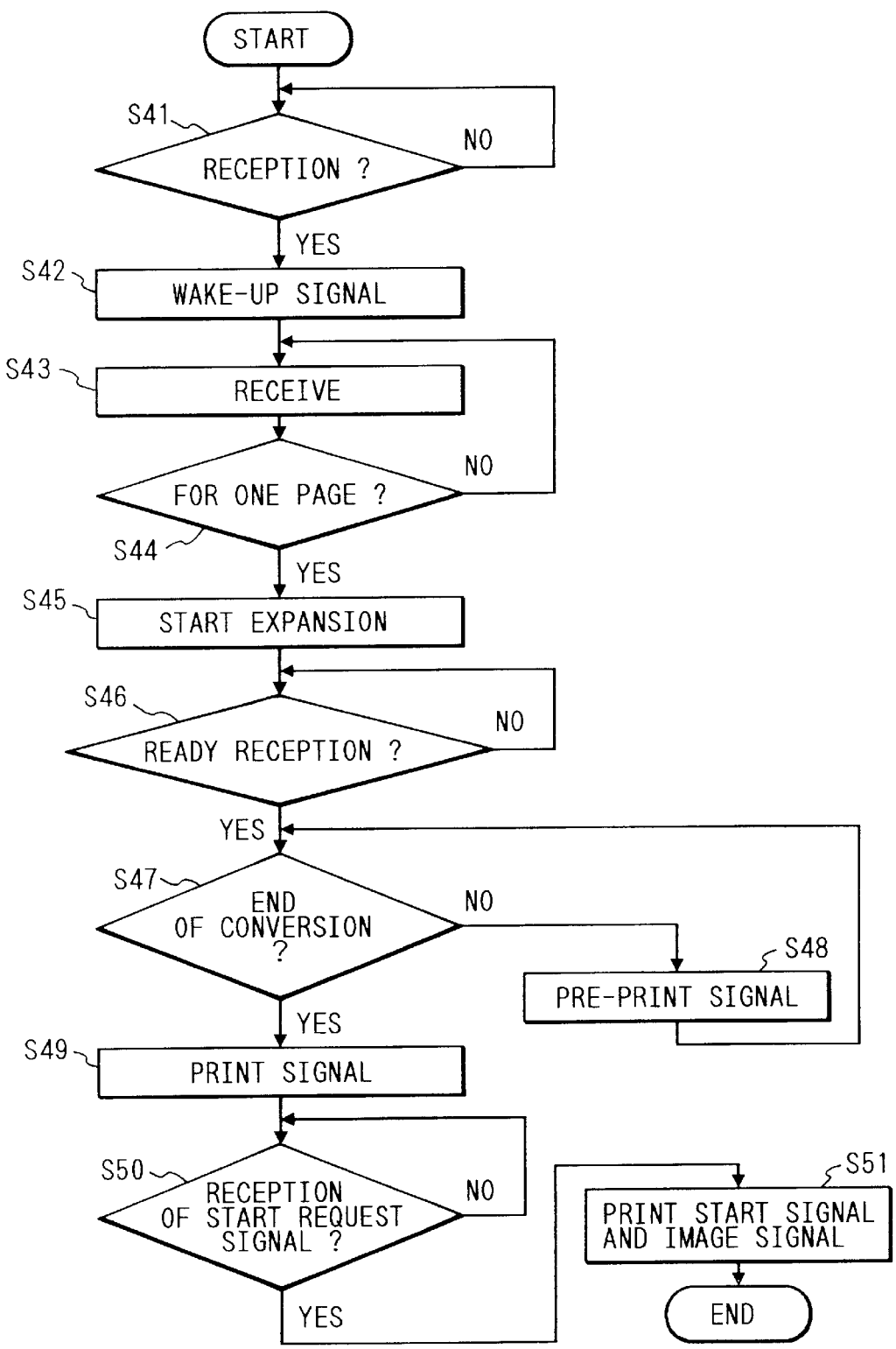
FIGS. 15A and 15B are flowcharts for explaining the operations of the controller unit and the engine unit.
Figure 15B:
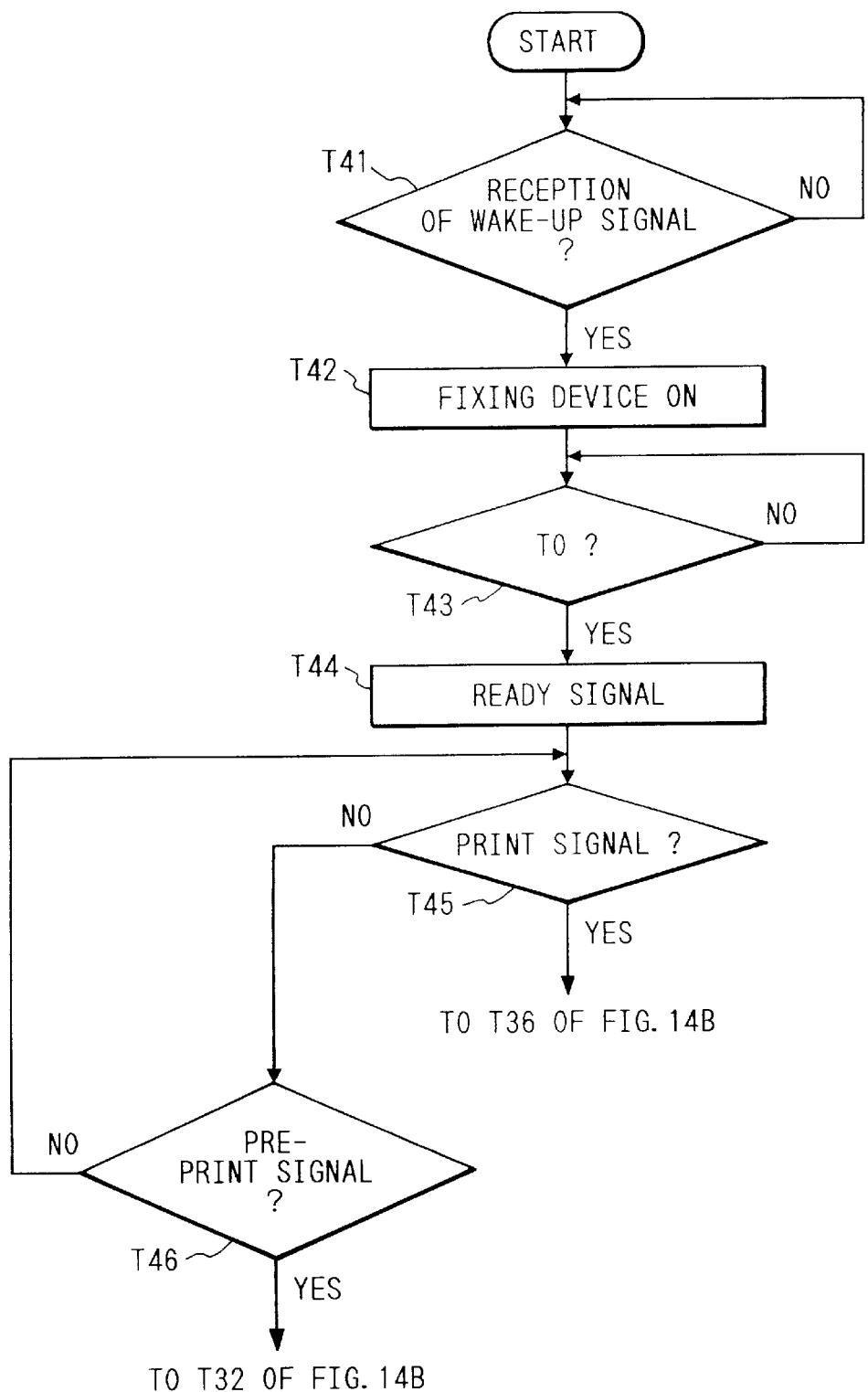

The embodiment 5 will now be described with reference to a timing chart of FIG. 12. The embodiment differs from the embodiment 3 with respect to a point that the "wake-up signal" is used instead of the "preprint signal" as a signal which is generated by receiving the code information in the embodiment 3. After the operations in steps T41 to T44 in FIG. 15B were executed, the engine unit executes the operations in step T32 and subsequent steps in FIG. 14B. At a stage when the code information is received from the external information processing apparatus, the controller unit transmits the wake-up signal to the engine unit (timing a). In response to the wake-up signal, the engine unit 1 starts the current supply to the heater 40c of the heating roller 40a, thereby raising the temperature T. In this instance, although the controller unit 2 starts to convert the code information to the pixel information, since the temperature of the heating roller 40a is still low, the engine unit 1 cannot accept the command from the controller unit 2. At a time point when the temperature T of the heating roller 40a reaches a predetermined temperature T3 lower than the predetermined temperature T2 at which the ready signal is transmitted, the engine unit 1 starts the rotation of the laser scanner 32 (timing g). Subsequently, after the elapse of a predetermined time (or in accordance with the temperature of the heating roller), the paper feed of the recording material and the pre-rotation of the photosensitive drum 34 are sequentially executed (timings j, k, l, m, n). When the temperature of the heating roller 40a reaches the temperature T2 at which the toner on the recording material can be fixed, the ready signal is transmitted, thereby informing a fact that the command from the controller unit can be accepted (timing h). At this timing, the laser scanner 32 has already been built up, the recording material is held in a standby state at the registration roller 37, and the pre-rotation of the photosensitive drum 34 has also already been finished. After that, when the pixel information converting operation is finished, the controller unit 2 transmits the print signal (timing e). The engine unit 1 immediately transmits the print start signal request signal (timing i) and starts the printing to the recording material by the print start signal from the controller unit 2 (timing f). As a timing for transmitting the ready signal from the engine unit 1 to the controller unit 2, the ready signal can be also transmitted just before the timing when the temperature of the heating roller 40a reaches the temperature at which the toner on the recording material can be fixed in consideration of a time which is required to communicate the signal. When the pixel information converting operation in the controller unit 2 is not finished at the stage when the ready signal is transmitted from the engine unit 1, so long as the print signal from the controller unit 2 is not transmitted in a predetermined time, the rotation of the photosensitive drum 34 is first built down and the rotation of the laser scanner 32 is subsequently built down. The apparatus enters a standby state of the print signal.

By performing the print preparing operation upon wake-up at the above timings, almost of the print preparing operation is completed until the heating roller reaches the ready temperature. The first printing time after the wake-up is remarkably reduced as compared with the case of building up the print preparing operation after the transmission of the ready signal in the conventional method. Further, as for the time which is required for the print preparing operation, since the temperature of the heating roller is detected, the time at which the heating roller reaches the ready temperature can be predicted. Therefore, by making the timing when the build-up of the laser scanner is completed coincide with the timing when the heating roller reaches the ready temperature, the laser scanner is not rotated for a longer time than it is needed, so that no adverse influence is exerted to the life. The same shall also apply to the pre-rotating time of the photosensitive drum. In the embodiment 5, although the timings to build up the laser scanner and to start the pre-rotation have been determined in accordance with the temperature of the heating roller, in order to further improve the precision, it is also possible to detect an increasing gradient of the temperature of the heating roller and to determine the timings for building up the laser scanner and starting the pre-rotation on the basis of the gradient and the temperature of the heating roller.

[Embodiment 6]

Figure 13:
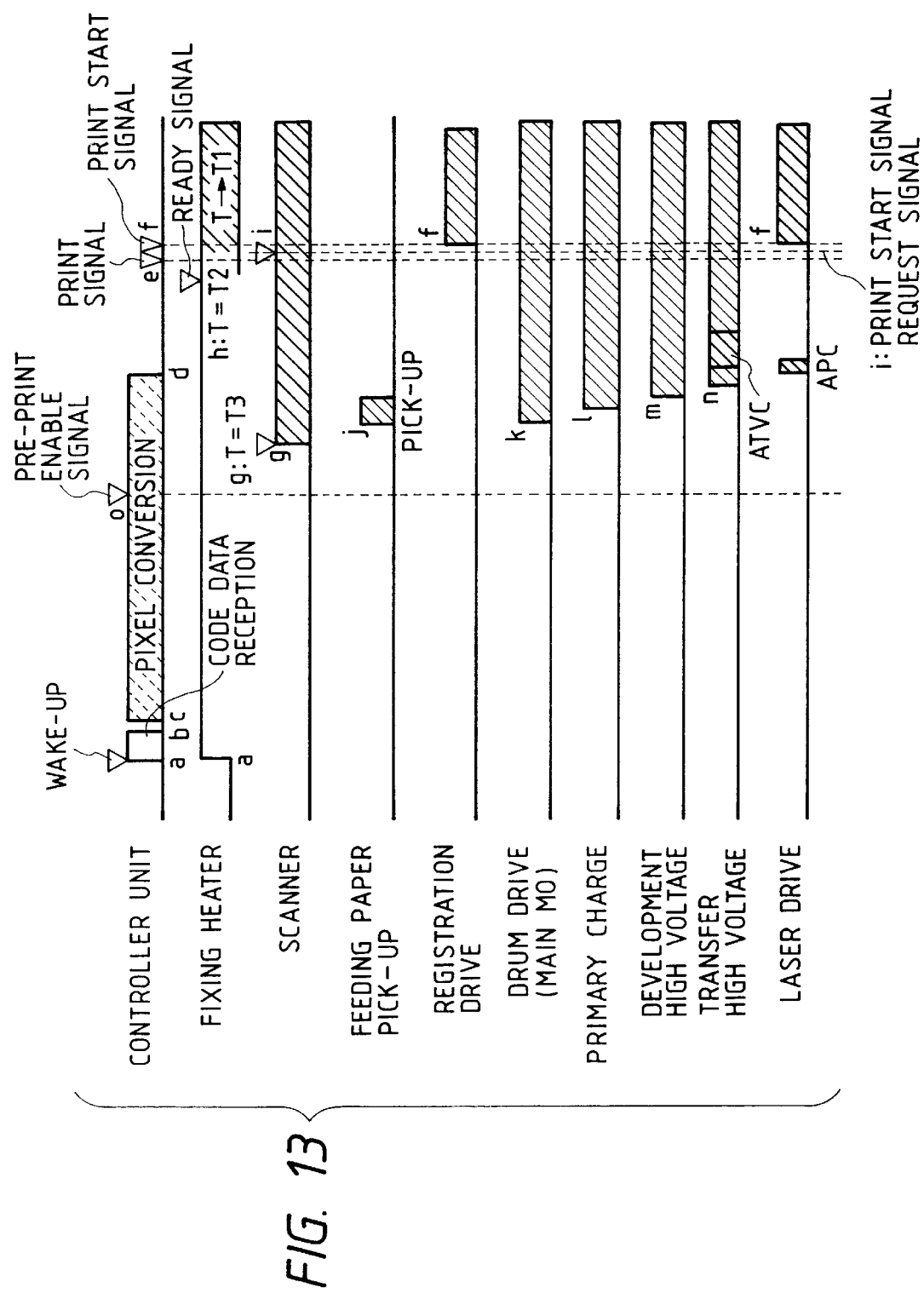
FIG. 13 is a timing chart of the electrophotography printer for explaining the invention.

FIG. 13 is a timing chart showing the embodiment 6 of the invention. Since an electrophotography printer to which the embodiment 6 is applied is similar to those of the embodiments 1 to 5, its description is omitted. The embodiment relates to the reduction of the first printing time in case (wake-up mode) of starting the printing in what is called a sleep mode in which the current supply to the heating roller fixing device 40 is perfectly shut off in the standby state. The heating roller fixing device 40 is built up in the wake-up mode and when the temperature of the heating roller 40a reaches a predetermined temperature, the build-up of the laser scanner 32, paper feed of the recording material, and pre-rotation of the photosensitive drum 34 are sequentially executed. At a time point when the temperature of the heating roller 40a reaches the temperature at which the toner on the recording material can be fixed, the above series of print preparing operations have already been completed. In the embodiment 6, for a period of time during which the ready signal is not transmitted from the engine unit 1, among the signals from the controller unit 2, only the wake-up signal (a command to start the current supply to the heater and to raise the temperature of the heating roller) and a pre-print enable signal (a command to permit the engine unit to start the print preparing operation before the ready signal is transmitted) are accepted. After the ready signal was transmitted, the print preparing operation of the engine unit 1 is started by the pre-print signal and print signal from the controller unit 2 in accordance with the progressing situation of the pixel information converting operation.

Further, in the embodiment 6, the controller unit 2 monitors the progressing situation of the pixel information converting operation, transmits the pre-print enable signal before the ready signal from the engine unit 1 is transmitted in accordance with the progressing situation, and starts the print preparing operation in response to the pre-print enable signal.

Figure 16A:
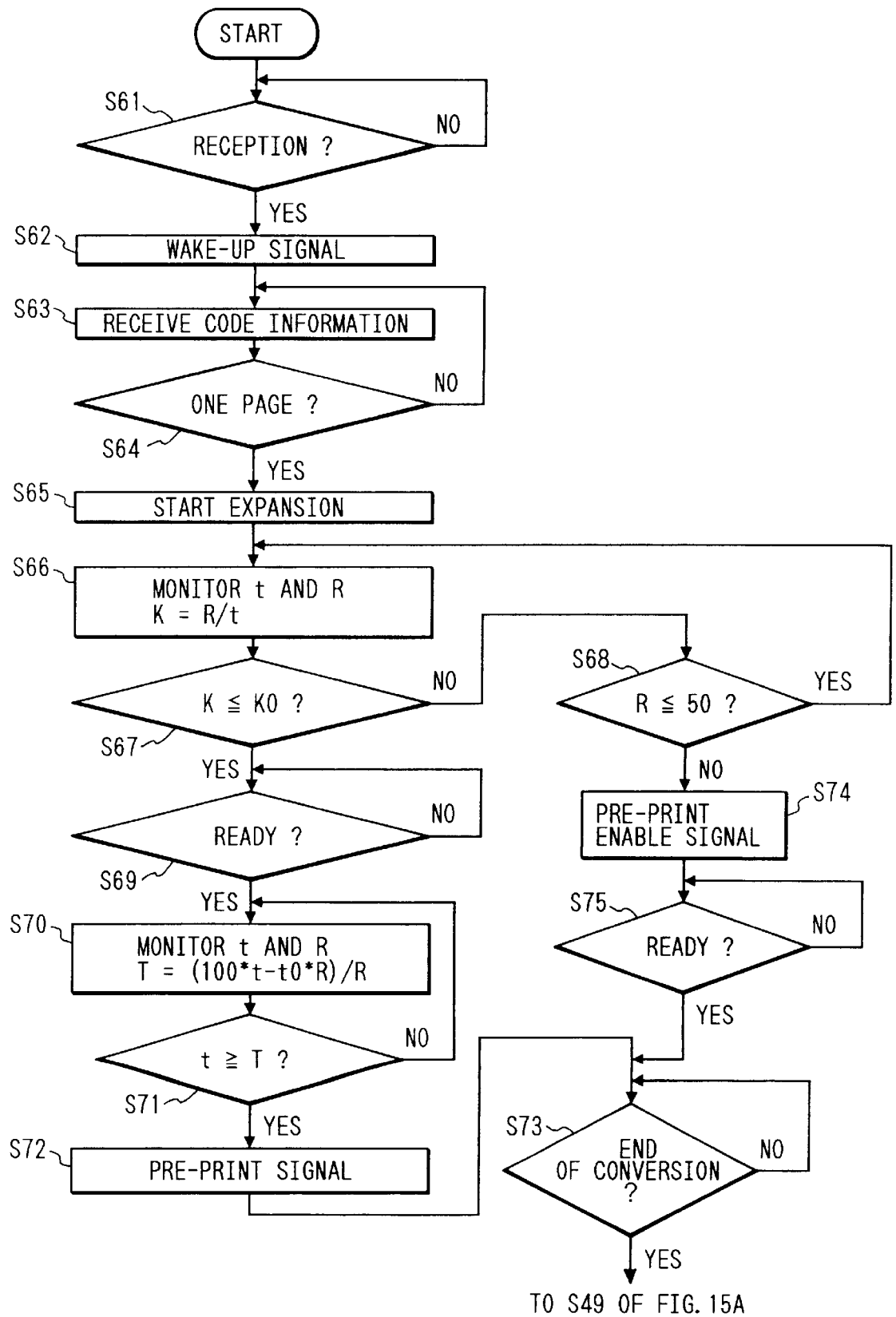
FIGS. 16A and 16B are flowcharts for explaining the operations of the controller unit and the engine unit.
Figure 16B:
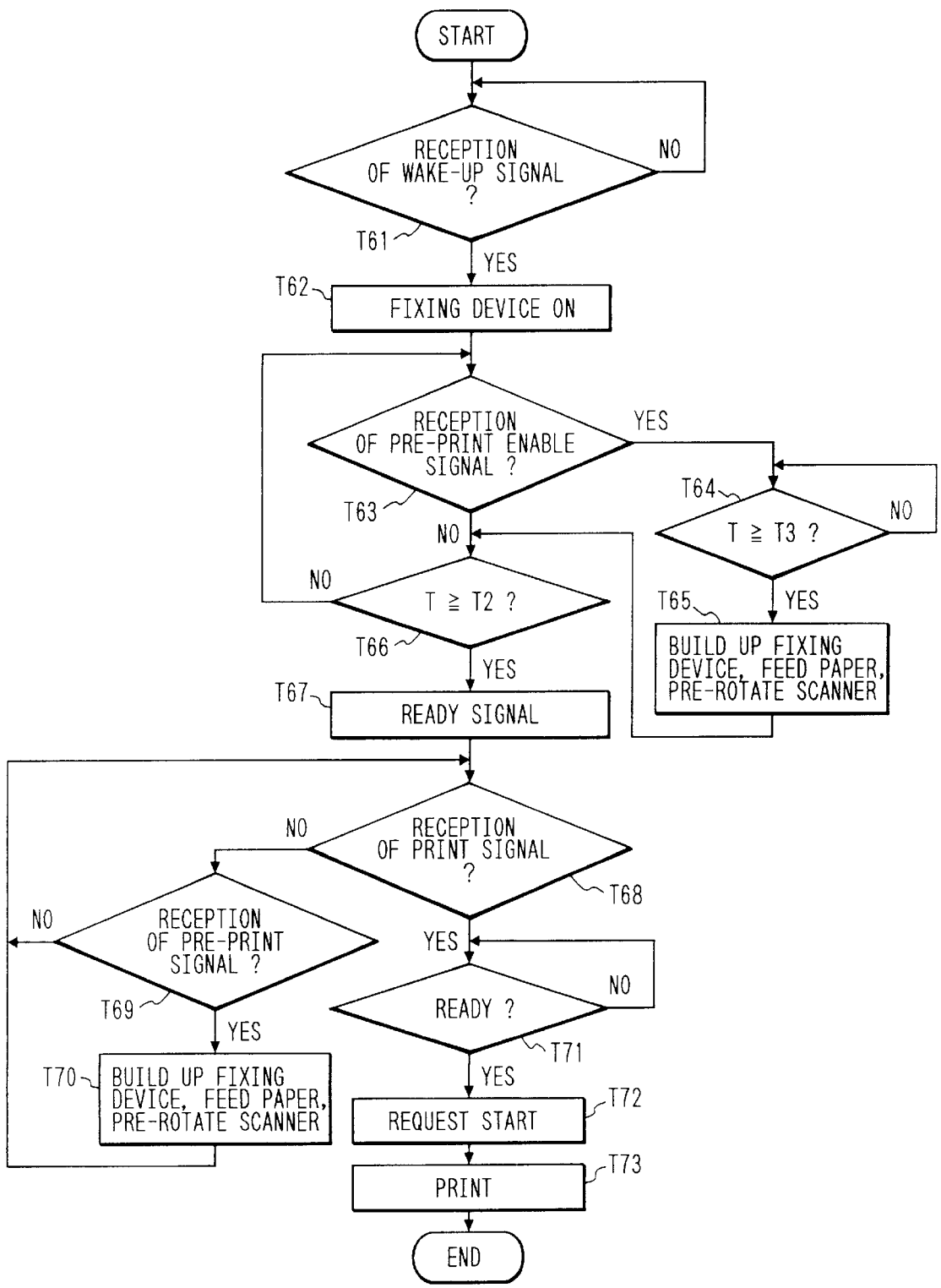

The embodiment 6 will now be described hereinbelow with reference to the timing chart of FIG. 13 and the flowcharts of FIGS. 16A and 16B. When the code information is received from the external information processing apparatus (S61), the controller unit 2 transmits the wake-up signal to the engine unit [timing a (S62)]. In response to the wake-up signal, the engine unit 1 starts the current supply to the heater 40c of the heating roller 40a (T61, T62) and raises the temperature T. In this instance, although the controller unit 2 starts to convert the code information to the pixel information [timing c (S65)], since the temperature of the heating roller 40a is still low, the engine unit 1 can accept only the pre-print enable signal among the commands from the controller unit 2. The controller unit 2 monitors the progressing situation of the pixel information converting operation by the method described in the embodiment 1. When it is judged that the pixel information converting operation can be finished within a predetermined time, the pre-print enable signal is transmitted [timing c (S74)]. When the pre-print enable signal is received (T63), the engine unit 1 starts the rotation of the laser scanner 32 at a time point when the temperature T of the heating roller 40a reaches the predetermined temperature T3 lower than the predetermined temperature T2 at which the ready signal is transmitted (timing g). Subsequently, after the elapse of a predetermined time (or in accordance with the temperature of the heating roller), the paper feed of the recording material and the pre-rotation of the photosensitive drum 34 are sequentially executed [timings k, l, m, n (T65)]. When the temperature of the heating roller 40a reaches the temperature T2 at which the toner on the recording material can be fixed, the ready signal is transmitted (T66, T67), thereby informing a fact that the command from the controller unit can be accepted (timing h). Ordinarily, at this timing, the laser scanner 32 has already been built up, the recording material is held in a standby state at the registration roller 37, and the pre-rotation of the photosensitive drum 34 has also already been finished. After that, when the pixel information converting operation is finished, the controller unit 2 transmits the print signal [timing e (S49)]. The engine unit 1 immediately transmits the print start signal request signal [timing i (T71, T72)] and starts the printing to the recording material by the print start signal from the controller unit [timing f (T73)]. As for the timing to transmit the ready signal from the engine unit 1 to the controller unit 2, the ready signal can be also transmitted just before the temperature T of the heating roller 40a reaches the temperature at which the toner on the recording material can be fixed in consideration of the time which is required to communicate the signal. When the ready signal is transmitted from the engine unit 1, if the time of the pixel information converting operation increases more than it is predicted in the controller unit 2 and the converting operation is not finished, so long as the print signal from the controller unit 2 is not transmitted within a predetermined time, the rotation of the photosensitive drum 34 is first built down and the rotation of the laser scanner 32 is subsequently built down. The apparatus enters a standby state of the print signal. When the pre-print enable signal is not transmitted from the controller unit 2 even when the heating roller reaches the temperature at which the build-up of the laser scanner is started, at a stage when the pre-print enable signal is transmitted from the controller unit 2, the build-up of the laser scanner 32 is started. Subsequently, the pre-rotation of the photosensitive drum 34 is started. In the case where the pre-print enable signal is not transmitted from the controller unit 2 even when the heating roller 40a reaches the ready temperature, the print preparing operation is started in accordance with the pre-print signal in a manner similar to the embodiment 1. Since an algorithm for monitoring the progressing situation of the pixel information converting operation and for transmitting the pre-print enable signal and the preprint signal in the controller unit 2 is similar to that in the embodiment 1, its description is omitted.

By executing the print preparing operation upon wake-up at the timings as mentioned above, almost of the print preparing operation has been completed until the heating roller reaches the ready temperature. The first printing time after the wake-up is remarkably reduced as compared with that in case of building up the print preparing operation after the ready signal was transmitted as in the conventional method. Further, as for the time which is required for the print preparing operation, by monitoring the progressing situation of the pixel information converting operation in the controller unit, even if it takes a long time for the pixel information converting operation, the surplus rotation of the laser scanner and pre-rotation of the photosensitive drum can be eliminated. Thus, an adverse influence is never exerted on the life.

According to the invention as described above, the code information is received from the external information processing apparatus, the progressing situation of the converting operation of the code information into the pixel information is monitored, the pre-print signal is transmitted from the controller unit to the engine unit in accordance with the progressing situation, and the engine unit starts the print preparing operation. Thus, the code information is further received from the external information processing apparatus, the pre-print signal is transmitted from the controller unit to the engine unit at that stage, and the engine unit starts the print preparing operation and holds, particularly, the control values during the pre-rotating operation. Consequently, the first printing time can be reduced without rotating the photosensitive drum and laser scanner for a long time than it is needed.

Further, after the heating roller was built up after the wake-up, by maintaining the stop state and by executing the print preparing operation on the basis of the temperature of the heating roller upon wake-up, the first print time upon build-up from the sleep mode can be reduced without exerting an adverse influence on the life of the photosensitive drum.

The present invention is not limited to the foregoing embodiments but many modifications and variations are possible within the spirit and scope of the appended claims of the invention.

What is claimed is:

1. An apparatus comprising:
   means for converting first information to second information;
   control means for starting an output preparing operation before the conversion of the first information of one page to the second information is finished;

means for predicting a time which is required for conversion of the first information of one page to the second information; and means for stopping the output preparing operation which has already been started on the basis of the prediction of said predicting means.

2. An apparatus according to claim 1, wherein in the case where the predicted time is longer than a predetermined time, said stopping means stops the output preparing operation which has already been started.

3. An apparatus according to claim 1, further having:

means for counting an elapsed time; and means for restarting the output preparing operation on the basis of a count time and the prediction.

4. An apparatus according to claim 1, further having means for recording on the basis of the second information by an electrophotography method.

5. An apparatus according to claim 4, wherein said recording means has:

a polygon mirror for scanning onto a photosensitive material by a light beam modulated on the basis of the second information;

means for primary charging said photosensitive material;

means for developing a latent image formed on the photosensitive material by the scan of said light beam; and means for transferring said developed image, and wherein said output preparing operation includes at least one of an operation for rotating said polygon mirror at a predetermined rotational speed and an operation for energizing each of primary charging means, developing means, and transfer means while rotating said photosensitive material.

6. An image output control apparatus comprising:

means for converting first information to second information;

means for recording on the basis of the second information by an electrophotography method;

control means for starting an output preparing operation before the conversion of the first information of one page to the second information;

means for holding a control value determined during said output preparing operation;

means for temporarily stopping the output preparing operation; and means for restarting the output preparing operation, wherein said output preparing operation to be restarted is executed on the basis of the control value held in said holding means.

7. An apparatus according to claim 6, wherein in the case where the conversion is not finished even when a certain time elapses after the output preparing operation was started, said temporary stop means temporarily stops the output preparing operation.

8. An apparatus according to claim 6, further having input means for inputting the first information from an outside, and wherein in the case where said apparatus is in a standby state, a heat fixing device for fixing an image on a recording medium is shifted to a fixing enable state from a deenergizing state or standby state in response to the input of the first information.

9. An apparatus according to claim 6, wherein said recording means has:

a polygon mirror for scanning onto a photosensitive material by a light beam modulated on the basis of the second information;

means for primary charging said photosensitive material;

means for developing a latent image formed on the photosensitive material by the scan of said light beam; and means for transferring said developed image, wherein said control value includes at least one of a value to specify a drive current to turn on means for generating said light beam and a value to specify a transfer voltage in said transfer means.

10. An apparatus comprising:

means for inputting first information from an external apparatus;

means for converting the first information to second information;

image formation control means for controlling image forming means for forming an image onto a recording medium on the basis of the second information; and fixing control means for controlling a fixing device to fix the image formed on said recording medium, wherein said fixing control means executes a preparing operation including activating the fixing device from a non-activated state in response to an input of the first information, and said image formation control means allows said image forming means to execute another preparing operation on the basis of a temperature of said fixing device.

11. An apparatus according to claim 10, wherein in the case where a predetermined time has elapsed without starting an image forming operation, said image formation control means stops the preparing operation which has already been started.

12. An apparatus according to claim 11, further comprising means for predicting a time which is required for conversion of the first information of one page to the second information, wherein said image formation control means has means for outputting a signal to start said other preparing operation on the basis of a conversion situation of the first information of one page to the second information after a temperature of the fixing device has reached a predetermined temperature when the predicted time is longer than a predetermined time.

13. An apparatus according to claim 10, wherein said image forming means forms an image on the basis of the second information by an electrophotography method.

14. An apparatus according to claim 13, wherein said image forming means has:

a polygon mirror for scanning onto a photosensitive material by a light beam modulated on the basis-of the second information;

means for primary charging said photosensitive material;

means for developing a latent image formed on the photosensitive material by the scan of said light beam; and means for transferring said developed image, and wherein said other preparing operation includes at least one of an operation for rotating said polygon mirror at a predetermined rotational speed and an operation for energizing each of primary charging means, developing means, and transfer means while rotating said photosensitive material.

15. An apparatus comprising:

means for converting first information to second information;

detecting means for detecting a conversion situation of first information of one page to second information; and means for controlling a rotation of a polygon mirror to scan onto a photosensitive material by a light beam modulated on the basis of the second information, wherein said control means has means for starting the rotation of said polygon mirror in accordance with the detected conversion situation of the first information of one page to the second information.

16. An apparatus according to claim 15, further having:

means for inputting the first information from an external apparatus; and fixing control means for activating a heat fixing device for fixing an image on a recording medium from a deenergizing state in response to the input of the first information by said input means.

17. An apparatus according to claim 16, wherein said control means has means for predicting a time which is required to convert the first information of one page to the second information, and when a predicted time is shorter than a predetermined time, the rotation of said polygon mirror is started in accordance with a temperature of the fixing device.

18. An apparatus according to claim 15, further having:

means for inputting the first information from an external apparatus; and means for shifting a heat fixing device to fix an image on a recording medium from a standby state to a fixing enable state in response to the input of the first information by said input means.

19. An apparatus according to claim 18, further having means for predicting a time which is required to convert the first information of one page to the second information, and wherein said control means has:

means for starting the rotation of said polygon mirror in response to the input of the first information by said input means; and means for stopping the rotation of said polygon mirror in the case where the time predicted by said predicting means is longer than a predetermined time.

\* \* \* \* \*

UNITED STATES PATENT AND TRADEMARK OFFICE
CERTIFICATE OF CORRECTION

PATENT NO. : 5,850,245

DATED : December 15, 1998

INVENTOR(S) : MASAHIRO GOTO, ET AL.

Page 1 of 2

It is certified that error appears in the above-identified patent and that said Letters Patent is hereby corrected as shown below:

COLUMN 1:
    Line 46, "the" should read --this--.

COLUMN 2:
    Lines 4 and 5, "in a heat fixing apparatus;
              and the like." should read
      --in a heat fixing apparatus; and the like--;

Line 64, "long" should read --longer--; and
    Line 65, "a" should be deleted.

COLUMN 4:
    Line 23, "an" should read --a--.

COLUMN 6:
    Line 3, "received" should read --receives--.

COLUMN 10:
    Line 55, "almost" should read --most--.

UNITED STATES PATENT AND TRADEMARK OFFICE
CERTIFICATE OF CORRECTION

PATENT NO.   : 5,850,245

DATED        : December 15, 1998

INVENTOR(S) : MASAHIRO GOTO, ET AL.                    Page 2 of 2

It is certified that error appears in the above-identified patent and that said Letters Patent is hereby corrected as shown below:

COLUMN 14:
    Line 21, "almost" should read --most--.

COLUMN 16:
    Line 21, "almost" should read --most--.

COLUMN 18:
    Line 51, "basis-of" should read --basis of--.

Signed and Sealed this

Seventh Day of November, 2000

Attest:

Q. TODD DICKINSON

*Attesting Officer*  *Director of Patents and Trademarks*